Jan. 16, 1968   R. D. SNYDER   3,363,656
MEAT SLICING MACHINE

Filed Sept. 25, 1964   6 Sheets-Sheet 1

INVENTOR.
ROY D. SNYDER,
BY
Berman, Davidson + Berman
ATTORNEYS.

Jan. 16, 1968  R. D. SNYDER  3,363,656

MEAT SLICING MACHINE

Filed Sept. 25, 1964  6 Sheets-Sheet 4

INVENTOR.
ROY D. SNYDER,
BY
Berman, Davidson & Berman
ATTORNEYS.

Jan. 16, 1968   R. D. SNYDER   3,363,656
MEAT SLICING MACHINE
Filed Sept. 25, 1964   6 Sheets-Sheet 5

INVENTOR.
ROY D. SNYDER,
BY
Berman, Davidson & Berman
ATTORNEYS.

United States Patent Office 3,363,656
Patented Jan. 16, 1968

3,363,656
MEAT SLICING MACHINE
Roy D. Snyder, Delta, Pa. 17314
Filed Sept. 25, 1964, Ser. No. 399,228
14 Claims. (Cl. 146—103)

This invention relates to the general field of food slicing machines and, more specifically, the instant invention relates to a machine for the slicing of meats and other substantially solid bulk foods.

One of the primary objects of this invention is to provide a pendulum blade type slicing machine mounted on a single pivot for oscillatory movement across the feed path of commestible products having a substantially solid bulk form to sever a portion thereof from the main body of the bulk food.

Another object of this invention is to provide a pneumatically-operated bulk meat slicing machine of the pendulum type and employing a pneumatically-actuated rotating meat slicing disc together with pneumatically-operable means to feed the bulk meat in timed sequential movements and in a path perpendicular to the path of movement of the slicing disc.

A further object of this invention is to provide a pneumatically-operated bulk meat slicing machine of the pendulum type and of the type generally described supra, together with means for sensing the presence or absence of the meat at the meat slicing station.

Still a further object of this invention is to provide a pneumatically-operable pendulum type bulk meat slicing or cutting machine including a pneumatically-actuating rotating meat slicing or cutting disc mounted for oscillatory movement across the feed path of the bulk meat to be sliced or cut, together with meat sensing and control means for volumetrically controlling the amount of meat to be sliced or cut.

Still another object of this invention is to provide, in a device of the type generally described above, pneumatically-operated conveyor means responsive to the meat sensing means to successively present bulk meat to the slicing or cutting disc in controlled volumetric amounts together with means to prevent an uncontrolled volume of meat at the trailing end of the bulk meat from being dispensed, the trailing end portion of the bulk meat having a volume less than the controlled volume of the preceding slices or cuts from the bulk meat.

It is a still further object of this invention to provide, in a device of the type generally described above, reciprocable shutter means to receive and retain the aforementioned trailing end piece of less than the desired volume as the same leaves the cutting station.

Yet another object of this invention is to provide a pneumatically-actuable high-speed means for providing oscillation to a pneumatically-operated pendulum type rotatable bulk meat slicing or cutting disc together with means to arrest the motion of the disc at its respective opposite high points of swinging movement without imparting appreciable shock to the means providing the oscillation and the cutting disc without materially impairing the speed of revolution of the slicing or cutting disc.

This invention has, as still another object thereof, the provision of a machine for cutting or slicing, consecutively, controlled volumes of meat slices or cuts severed from bulk meat and dispensing the slices or cuts to the open upper end of a plurality of containers or receptacles which are presented in sequential order to the dispensing end of the machine.

It is further proposed to provide a meat slicing or cutting machine of the type described generally above, the oscillatory movement of the meat slicing or cutting disc thereof taken together with the direction of rotation of the disc being such as to throw the severed meat slices or cuts downwardly into the receptacles or containers sequentially presented to the dispensing end of the machine below the point of meat severance.

This invention contemplates, as a still further object thereof, which when considering the nature of the meat slicing or cutting machine and the involved controls thereof, is relatively non-complex in construction and assembly, inexpensive to manufacture and maintain, and which is durable in use.

Other and further objects and advantages of the instant invention will become more evident from a consideration of the following specification when read in conjunction with the annexed drawings, in which:

FIGURE 4 is a fragmentary top plan view, FIGURE 4 being taken substantially on the horizontal plane of line 4—4 of FIGURE 3, looking in the direction of the arrows;

Referring now more specifically to the drawings, reference numeral 20 designates, in general, a meat slicing machine constructed in accordance with the teachings of this invention. The machine 20 is seen to comprise a substantially V-shaped trough support 22 having downwardly-converging arms 24, 26, and as is clearly seen in FIGURES 5 and 6, the trough support arm 24 is inclined at an acute angle of 60° to the horizontal and the trough support arm 26 is at an angle of substantially 30° with respect thereto thereby making the angle between the arms 24 and 26 substantially 90°.

Figure 1:
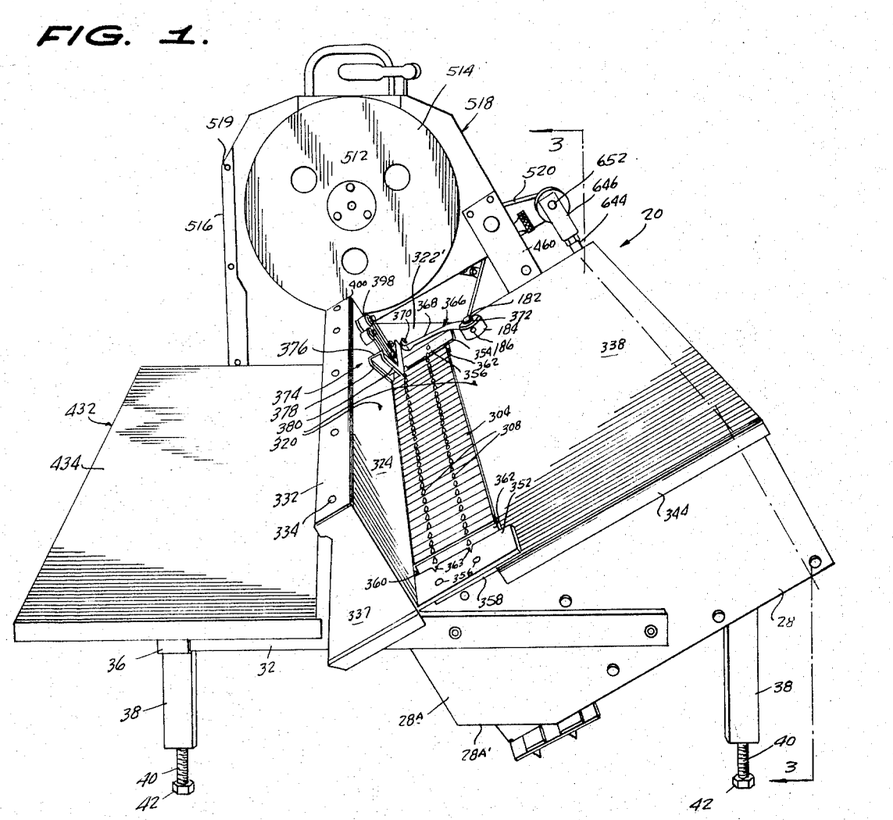
FIGURE 1 is a front end perspective view of a meat slicing or cutting machine constructed in accordance with this invention.

The opposed front and rear ends of the trough support 22 are closed by a pair of substantially rectangular front and rear end closure plates 28, 30 which are fixedly secured thereto by conventional means, the plates 28, 30 having end extensions 28A, 30A, respectively, which extend downwardly and inwardly from their associated arms 28, 30, respectively. As is shown in FIGURE 1, the lower corner 28A′ of the front closure plate extension 28A is cut to form an angle of zero degrees relative to the horizontal, and the lower corner of the rear closure plate extension 30A is similarly cut as at 30A′, see FIGURE 2.

Fixedly secured to the front closure plate 28 and to its extension 28A is one end of a first elongated substantially rectangular bar 32, the bar 32 having its other end projecting beyond the arm 24. A similar bar 34 has one of its respective ends fixedly connected to the rear closure plate 30 and to its extension 30A and projects beyond the arm 24. The two bars 30, 32 are horizontal and are parallel with respect to one another. As is seen in the drawings, extending between the outer ends of the bars 30, 32 and fixedly secured thereto by conventional means is an elongated substantially rectangular third bar 36 (see FIGURES 1 and 5).

Thus it is seen that the trough support 22 with its end closure plates 28, 30 and their associated extensions 28A and 30A, taken together with the aforementioned first, second and third bars 32, 34 and 36, respectively, form an elongated substantially rigid rectangular frame.

Reference numeral 38 designates one of a pair of upright substantially rectangular front end legs into the lower ends of each of which is threaded adjustable levelling screws 40 having enlarged heads 42 adapted for engagement with the support surface (not shown). As is seen in FIGURES 1 and 5, the upper end of the leg 38 at the front of the machine 20 is connected by Allen screws 44 to the third bar adjacent the front end thereof, and the other of the legs 38 has its upper end fixedly secured by conventional means (not shown) to the underside of the arm 26 adjacent the front end of the latter.

Indicated by reference numerals 46 are a pair of upright substantially rectangular rear end legs (see FIGURES 2 and 3), of which the upper end of the legs 46 is fixedly secured, by conventional means not shown, to the arm 26 adjacent the rear end thereof, and the other of the legs 46 is fixedly secured to the third bar 36 adjacent the rear end of the latter as by conventional means. Into each leg 46 is threaded an adjustable levelling screw 48, the latter being threaded throughout its length with the lower ends of the legs 46 being adapted to engage a support surface (not shown) and to serve a further function to be described.

Figure 5:
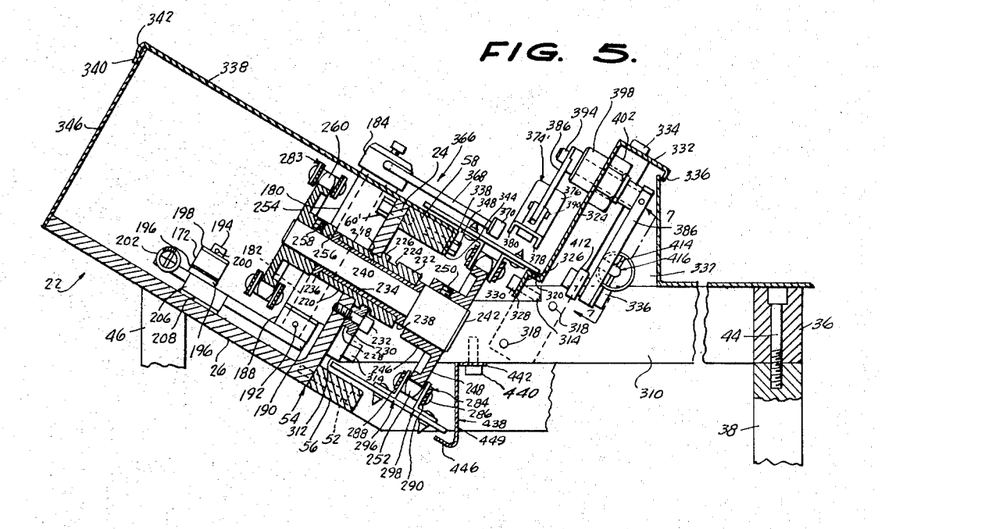
FIGURE 5 is an enlarged detail cross-sectional view, FIGURE 5 being taken substantially on the vertical plane of line 5—5 of FIGURE 3, looking in the direction of the arrows.
Figures 6, 14:
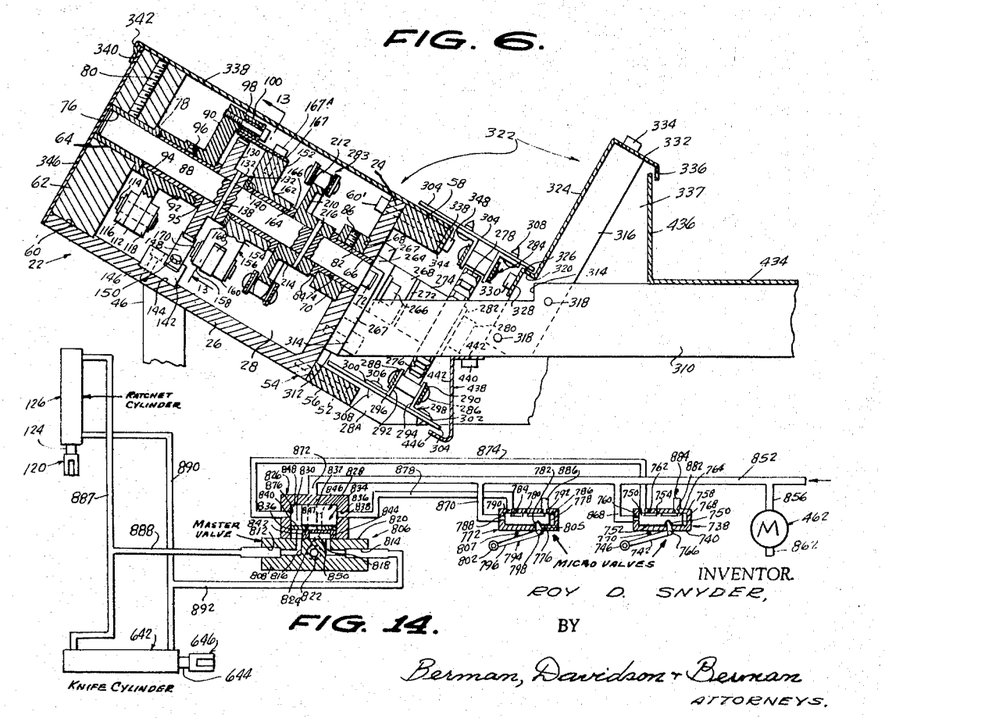
FIGURE 6 is an enlarged detail cross-sectional view, FIGURE 6 being taken substantially on the vertical plane of line 6—6 of FIGURE 3, looking in the direction of the arrows.
FIGURE 14 is a schematic view illustrating the pneumatic system employed herein and the several controls therefor.

Fixedly secured, as by Allen screws 52, to the arm 24 adjacent the apex 54 formed at the junction of the arms 24, 26, and projecting laterally therefrom and extending longitudinally thereof, is a fourth elongated substantially rectangular bar 56 (see FIGURES 5 and 6). Reference numeral 58 connotes a fifth elongated substantially rectangular bar, the bar 58 projecting laterally from and extending longitudinally of the arm 24 being secured thereto, adjacent the upper side of the latter as by bolts 60′. As is seen in FIGURES 5 and 6, the fifth bar 58 is substantially parallel to and is vertically-spaced from the fourth bar 56.

Referring now to FIGURE 6, reference numeral 60 indicates a recess extending inwardly from the upper side of the arm 26 adjacent its outer longitudinally-extending marginal edge and proximate the rear end of the trough support 22, the recess 60 having releasably secured therein, by conventional means not shown, one end of an upwardly-inclined substantially rectangular bearing block 62. The bearing block 62 is provided with a transversely-extending first bore 64 intermediate its ends aligned with a second bore 66 extending through the arm 24. The arm 24 is constructed with an upwardly-opening counterbore 68 having one end of a cylindrical bearing block 70 seated and secured therein as by a pair of diametrically-disposed bolts 72, only one of the bolts 72 being shown. The bearing block 70 is formed with a transversely-extending bore 74.

Fitted within the bore 64 is a first hollow cylindrical bushing 76 having an inwardly-facing first thrust collar 78 integrally-formed therewith. A set screw 80 is threaded downwardly from the upper end of the bearing block 62 to engage against the bushing 76 to hold the same against rotation. A second hollow cylindrical bushing 82 has one of its ends fitted within the bore 66, the other end thereof extending into the V-shaped trough support 22 and terminating in a second thrust collar 84. As is seen in FIGURE 6, the bushing 82 extends throughout the bearing block 70 with the collar 84 abutting against the outer end thereof. The bearing block 70 carries a set screw 86 which is threadedly mounted therein in such a manner that the inner end thereof engages the bushing 82 to hold the same against rotation.

Journaled for rotation in the bushings 76, 82 are the opposed ends, respectively, of an elongated substantially cylindrical shaft 88. Reference numeral 90 indicates a substantially triangular bell-crank lever having a laterally-projecting substantially hollow cylindrical hub 92 fitted with an elongated substantially hollow cylindrical bushing 94, the latter having a thrust collar 95 at the inner end thereof. Set screw 96 (see FIGURE 6) connects the hub 92 with the bushing 94. The bell-crank lever 90 is mounted for oscillatory movement on the shaft 88, the shaft 88 extending transversely through one of the ends of the bell-crank lever 90. A second end of the bell-crank lever 90 has secured thereto, as by screw 98, the intermediate portion of a pawl 100 having a nib 102 (see FIGURE 13) at one of its ends. The connection between the second end of the bell-crank lever 90 and the intermediate portion of the pawl 100 is of a pivotal type. The other end of the pawl 100 has an integrally-formed depending semispherical first spring retainer 104 which projects downwardly from the underside thereof. The third end of the bell-crank lever 90 is formed with a laterally-offset, substantially rectangular tab 106 from which arises a semispherical second spring retainer 108 normally disposed in confronting relation relative to the spring retainer 104. Interposed between the spring retainers 104, 108 is an axially-elongated helicoidal spring 110, the opposed ends of the spring 110 seating around the retainers 104, 108, the spring 110 being held under compression between the aforementioned other end of the pawl 100 and the tab 106 whereby the pawl 100 is constantly biased for pivotal movement on the screw 98 in a counterclockwise direction, reference being made to FIGURE 13. Integral with the hub 92 of the bell-crank lever 90 is a depending lever 112, the latter being pivotally connected on pivot pin 114 supported adjacent its opposed ends on the arms 116, 118 of a yoke 120 having a stem 122. The stem 122 is connected to one end of a piston rod 124 mounted for reciprocation through one end of a pneumatically-operable cylinder 126 to which further reference will be made infra. The other end of the cylinder 126 is pivotally connected on pivot pin 127 between a pair of bracket arms 128 (only one being shown in FIGURE 3) the arms 128 projecting upwardly from the upper end of a cylindrical base 129 which is secured to the arm 26 by conventional means, not shown.

Reference numeral 130 denotes a ratchet wheel having a plurality of teeth 131 and a hub 132. The ratchet wheel 130 is mounted on the shaft 88 and is keyed for rotation therewith as by the key 138. As is seen in the drawings, the ratchet wheel 130 bears against the thrust collar 95 and abutting against the outer end of the hub 132 is an annular spacer collar 140 mounted on the shaft 88.

Reference numeral 142 denotes a substantially rectangular mounting block having an end thereof disposed in a recess 144 which extends downwardly from the upper side of the arm 26. Allen screws 146 secure the block 142 in the recess 144. As is seen in FIGURE 6, one end of a leaf spring 148 is fixedly secured to the block 142 by a screw 150 and the other end of the spring 148 is adapted to releasably engage one of the teeth 131 to prevent the ratchet wheel 128 from rotating in a clockwise direction, reference being made to FIGURE 13.

Bearing against the inner side of the annular spacer collar 140 is the outer side of a segment member 152 which is integral with one end of a lever 154 that depends therefrom, and which terminates in a clevis 156 having arms 158, 160. The segment member 152 is formed with an inwardly-projecting hub 162 integral therewith and projecting from the other side thereof. The segment member 152 and its hub 162 have fitted therein a bushing 164 that terminates at its inner end in an outwardly-turned substantially circumferential thrust collar 166. Reference numeral 167 denotes an elongated shield having an arcuate transverse cross-section, one end of the shield 167 being releasably secured to the segment member 152 by means of a screw 167A, the other end of the shield 167 projecting laterally from the segment member 152 and extending below the pawl 100. The function of the shield 167 will be set forth in detail below.

An elongated substantially rectangular first link 168 has one of its ends pivotally connected between the clevis arms 158, 160 on a pivot pin 170, the inner end of the first link having integrally-formed therewith an axially and longitudinally-projecting threaded bolt 172 (see FIGURE 4) on the outer end of which is threaded one end of a turnbuckle 174. The other end of the turnbuckle 174 is threaded on the outer end of a second threaded bolt 176 that projects longitudinally and axially away from one end of a second link 178.

Projecting laterally from the outer side of the arm 24 and adjacent the rear end thereof is an upright substantially rectangular block 180 (see FIGURES 3 and 5) which is rigidly secured thereto by conventional means and in which is journaled, for pivotal movement, an elongated substantially cylindrical shaft 182 that projects beyond the upper and lower ends of the block 180. The shaft 182 is held against downward displacement by means of a substantially cylindrical stop collar 184 fixedly secured thereon adjacent the upper end thereof, as by a set screw 186, see FIGURE 1, to which further reference will be made below. The lower end of the shaft 182 extends through an enlarged boss 188 which is integral with and to which projects laterally and upwardly from one end of an elongated lever 190. The shaft 182 and boss 188 are connected together by a set screw 192. The lever 190 extends radially away from the boss 188 substantially parallel to the arm 26, and the other end thereof carries an upright pivot pin 194 (see FIGURES 4 and 5) on which is mounted a lower wear washer 196 followed by the other end of the second link 178 on which is superimposed an upper wear washer 198. A cotterpin 200 extends diametrically through the pivot pin 194 with the opposed ends thereof overlapping the second wear washer 198 to thereby retain the above-described assembly in the manner described. The other end of the lever 190 is connected to one end of a helicoidal spring 202, the other end of the spring 202 being anchored to a substantially rectangular lug 204 which extends inwardly of the trough support 22 from the end closure plate 30. The arrangement is such, reference being made to FIGURE 4, that the lever 190 is constantly biased for movement in a counterclockwise direction about the pivot pin 194. Disposed in the path of movement of the above-described lever 190 is a discoidal eccentric 206 mounted off-center on the upper end of a screw 208, the other end thereof being threaded in the arm 26 (see FIGURE 5).

Mounted on the shaft 88 and having one of its sides engaging against the thrust collar 166 is a first sprocket wheel 210 having teeth 212 on the periphery thereof, and projecting laterally from the other side of the sprocket wheel 210 is a substantially hollow hub 214 the outer end of which bears against the thrust collar 84. The hub 214, and consequently the sprocket wheel 210 is connected to the shaft 88 as by a diametrically-extending key 216 (see FIGURE 6).

Reference numeral 218 designates a bore extending transversely through the arm 24 adjacent to but spaced inwardly from the rear end of the machine 20 (see FIGURE 5). The bore 218 receives an elongated substantially hollow tubular journal 220 therethrough, the journal having an inner end projecting into the trough support 22 and an outer enlarged head 222 having a groove 224 formed therein adjacent the inner end thereof which inherently gives rise to a circumferential shoulder 226 (see FIGURE 5). The journal 220 is inserted through the bore 218 until the shoulder 226 engages against the outer side of the arm 24, and the shoulder 226 is held against the arm 24 by means of a cylindrical connector 228 having a circumferential flange 230 adapted to enter the groove 224. The connector 228 is held fixed against the arm 24 as by a screw 232 which extends axially therethrough and which is threaded into the arm 24. Fitted within the journal 220 is a bushing 234 having a circumferential thrust collar 236, 238 abutting against, respectively, the outer ends of the journal 220. Rotatably supported within the bushing 224 is an elongated shaft 240 extending on opposite sides of the arm 24 and having an enlarged outer end 242. The shaft 240 is parallel to the shaft 88 and is longitudinally-spaced therefrom toward the front end of the machine 20. The enlarged outer end of the shaft 240 receives the hub 246 of a second sprocket wheel 248 thereon, the sprocket wheel 248 being connected with the enlarged head 242 of the shaft 240 by means of a set screw 250 and is provided with spaced peripheral teeth 252.

Reference numeral 254 denotes a third sprocket wheel, the third sprocket wheel 254 being mounted on the outer end of the shaft 240 and being provided with a laterally-projecting hub 256 secured to the shaft 240 by a set screw 258. The sprocket wheel 254 is provided with a plurality of circumferentially-spaced peripheral teeth 260.

Figure 3:
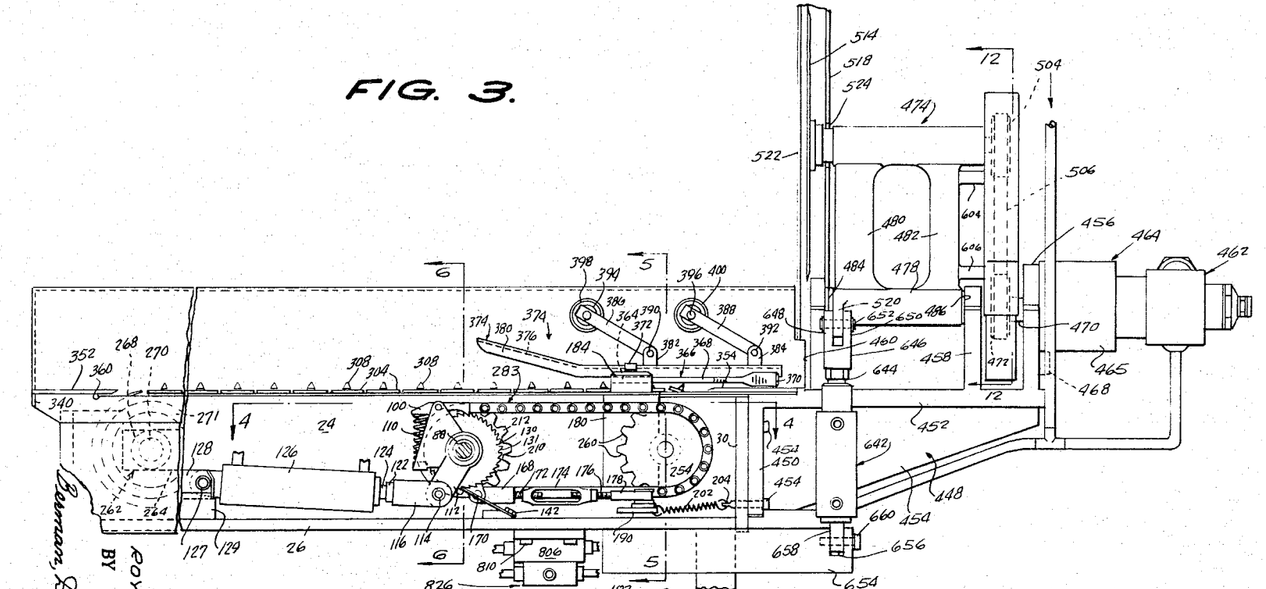
FIGURE 3 is a rear side elevational view taken substantially on the plane of line 3—3 of FIGURE 1, looking in the direction of the arrows, FIGURE 3 being rotated substantially 30° about its longitudinal axis from the position shown in FIGURE 1.

Reference numeral 262, reference being made to FIGURE 3, indicates a conventional chain tightening device comprising an elongated substantially rectangular block 264 having an elongated longitudinally-extending slot (not shown) formed therein adjacent one of its ends. One or more securing bolts 266 extend through the aforementioned slot of the block 264 and are threaded into the arm 24 to hold the block 264 in horizontally-adjusted relation. The outer end of the block 264 is slidable between a pair of vertically-aligned and spaced guide pins 267 which project laterally and outwardly from the underside of the arm 24 and is provided with a laterally-projecting boss 268 in which is secured one end of a shaft 270. The other end of the shaft 270 has mounted thereon a washer 272 which (see FIGURE 6) at one side abuts against the outer end of the boss 268 and at its other side engages the outer end of a hub 274 of a fourth sprocket wheel 276 mounted on the other end of the shaft 270 and having circumferentially-spaced peripheral teeth 278. The other end of the shaft 270 has a flanged nut 280 threaded thereon with the flange 282 of the nut 280 engaged in the other side of the sprocket wheel 276 (see FIGURE 6). The arrangement is such that the sprocket wheel 276 is free to rotate on the shaft 270. As is seen in the drawings, the sprocket wheel 276 is disposed in alignment with the sprocket wheel 248.

At 283 is designated a first endless drive chain which is trained about the first sprocket wheel 210 and the third sprocket wheel 254 which is aligned therewith. A second driven endless conveyor chain 284 (see FIGURE 6) is trained about the second and fourth sprocket wheels 248, 276, respectively. The conveyor chain 248 includes a pair of pins 286 for each pair of oppositely-disposed pairs of links 288, 290 connecting the same together, and also serving to pivotally support a pair of oppositely-disposed legs 292, 294 of a pair of oppositely-disposed, laterally-spaced and substantially parallel supports 296, 298, respectively, having a substantially L-shaped configuration and including the legs 292, 294 and diverging feet 300, 302, respectively, the feet 300, 302 each supporting an elongated substantially rectangular conveyor platform 304 which is secured thereto by a pair of longitudinally-spaced rivets 306 having outer meat-engaging pointed ends or tines 308.

Reference numerals 310 designate a plurality of elongated stringers having a substantially rectangular configuration. The stringers 310 are longitudinally-spaced relative to the trough support arm 24 and the third frame bar 36, the outer ends of the stringers being welded or otherwise fixedly secured to the bar 36, and the respective inner ends terminating in inwardly-extending flanges 312 fixed to the arm 24 as by bolts 314 (see FIGURE 6). The inner end of each of the stringers 310 is notched at its upper edge as at 314, to serve a function to be described.

A trough back wall support 316 is provided for each stringer 310, the back wall supports 316 each having an elongated substantially rectangular configuration, the trough back wall supports being fixedly secured adjacent one of its respective ends to its associated stringer as by rivets 318 intermediate the ends of the latter. As is seen in FIGURES 5 and 6, the trough back wall supports 316 are upwardly-inclined at an acute angle toward the rear side of the machine 20. The front upper edge of each of the back wall supports is notched downwardly from the upper end thereof to form a shoulder 320 to which further reference will be made infra.

A two-piece trough is generally indicated by reference numeral 322, and in this occasion reference is made to FIGURES 1 and 6. One piece of the trough 322 includes an elongated substantially rectangular back wall 324 which is seated against the trough back wall supports 316 and has a forwardly-projecting laterally-extending substantially rectangular flange 326 superimposed on the shoulder 320. An elongated substantially rectangular skirt 328 is integrally-formed with the front marginal edge of the flange 326 and depends downwardly therefrom. As is seen in FIGURES 5 and 6, the skirt 328 is parallel to the back wall 324 and extends into the notch 324, previously described. The skirt 326 is releasably secured to the back supports 316 by bolts 330 (see FIGURES 5 and 6). The upper end of the back wall 324 terminates in an elongated top wall 332 releasably secured to the upper ends of the back wall supports 316 by bolts 334. Depending from the rear longitudinally-extending marginal edge of the top wall 332 is an elongated substantially rectangular flange 336 that extends downwardly therefrom in longitudinally-spaced and substantially parallel relationship relative to the back wall 324, and to which further reference will be made. The front ends of the back wall 324 and its top wall 332 are closed by substantially triangular panel 337.

Reference numeral 338 indicates an elongated substantially rectangular bottom wall forming the second piece of the two-piece trough 322. The bottom wall 338 includes a longitudinally-extending and depending substantially rectangular clip-type front flange 340 (see FIGURES 5 and 6) which is inwardly-offset relative to the front longitudinally-extending edge of the bottom wall 338, by means of a reverted end portion 342 interposed therebetween. The bottom wall 338 is also formed with a depending side flange 344 at the front end the machine 20 (see FIGURE 1) that is integral therewith and with the adjacent end of the front flange 340. A third elongated substantially rectangular flange 344 depends from the rear or back longitudinally-extending marginal edge of the bottom wall 338 intermediate its ends.

Extending across the free end of the arm 26 and secured thereto and to the adjacent ends of the front and rear closure plates 28, 30 is an elongated substantially rectangular front side plate 346, and as is seen in several figures of the drawings, the bottom wall 338 extends across the upper edges of the trough support closure plates 28, 30 and the upper edge of the front side plate 346 with the flanges 340, 344 releasably engaging the remotely-disposed sides of the front side plate 346 and the fifth rectangular bar 58, and with the flange 344 releasably engaging the outer side of the front end of the trough support closure plate 28. If desired, the flange 338 may be secured to the fifth bar 58 as by bolts 348.

The bottom wall 338 and the shoulder 326 extend parallel to one another in laterally-spaced relation to form a slot 350 between the adjacent confronting edges thereof, and the flange 326 and the bottom wall 338 at each adjacent pair of ends thereof are overlapped by a pair of longitudinally-spaced substantially rectangular spacer blocks 352, 354 that are secured to the front and rear end trough support plates 28, 30 by screws 356. Each spacer plate is provided with a depending integrally-formed substantially rectangular boss 358 (only one thereof being shown) having its opposed ends abutting against adjacent sides of the flanges 344 and skirt 328 to prevent lateral shifting of the latter toward one another. As seen in FIGURES 5 and 6, the oppositely-disposed ends of the conveyor platforms 304 overlap the marginal edges of the flange 320 and the bottom wall 338.

It will also be noted that the flange 320 and the bottom wall 338 are provided with opposed pairs of notches 360, 362, respectively, together with adjacent portions of the depending flange 344 and skirt 328 in order to permit the passage of the platforms 304 therethrough. The spacer blocks 352, 354 are also formed with longitudinally-spaced and confronting notches 363, 363', respectively, to permit the passage of the meat-engaging pointed ends or tines 308 therethrough.

The bottom wall 338 is formed with a suitable transversely-extending opening (not shown) adjacent the rear end thereof to receive the upper end of the shaft 182 therethrough with the stop collar 184 extending thereover. The stop collar 184 is diametrically bored to receive therein the foot portion 364 (see FIGURE 3) of an elongated meat-sensing lever 366. The lever 366 includes an elongated leg portion 368 which terminates, at its other or free end, in a laterally-offset end 370 (see FIGURES 1 and 5). The offset end 370 is inclined inwardly toward the back wall 324 and projects in the direction of the rear end of the bottom wall 338. A screw 372 releasably secures the foot portion 364 in the stop collar 184.

Meat hold-down means is provided adjacent the rear end of the machine 20 and comprises a downwardly-opening substantially U-shaped channel member 374 having a bight 376 (see FIGURE 1) from the opposed marginal edges of which downwardly-project elongated laterally-spaced and substantially parallel meat-engaging sidewalls 378, 380. As is clearly seen in FIGURES 1, 3 and 7, the channel member 374 includes a leading end portion 374' downwardly and rearwardly-inclined with respect to the rear end of the machine 20. Projecting outwardly and extending perpendicular to the bight 376 are a pair of longitudinally-spaced clevis-type lugs 382, 384 (see FIGURES 3 and 7) between the arms of which are connected, respectively, one of the ends of a pair of links 386, 388 pivotally connected thereto on pivot pins 390, 392. The other ends of the links 386, 388 are upwardly-inclined from the lugs 382, 384 and are fixedly secured to a pair of pivot pins 394, 396 adjacent one of their respective ends, the pivot pins 394, 396 extending transversely across the back wall 324 and being journaled for rotation in bosses 398, 400 which are held clamped against the back plate 324 as by nuts 402 which engage against the underside of the back plate or wall 324 when threaded on the inner ends of the bosses 398, 400.

Reference numerals 404, 406 designate a pair of elongated substantially rectangular links having one of their respective ends connected with the pivot pins 396, 394, respectively, for pivotal movement therewith. The other or lower ends of the links 404, 406 are pivotally connected on pins 408, 410 to which are also pivotally connected the opposed ends of an elongated substantially rectangular link 412. To the link 406, intermediate its ends and adjacent the pivot pin 410 is pivotally connected the foot portion 414 (see FIGURES 5 and 7) of an L-shaped hook 416 having integral therewith an elongated leg portion 418, the outer end of the latter terminating in an eye 420 through which is threaded the final convolution 422 of an elongated helicoidal spring 424. The helicoidal spring 424 terminates, at its other end, in a final convolution 426 which is threaded through one end of an elongated substantially rectangular strap 428, the other end of the strap 428 being fixedly secured to the upper end of an upright post 430 adjacent the upper end thereof, the lower end of the post 430 being fixedly secured to one of the stringers 310.

Figure 7:
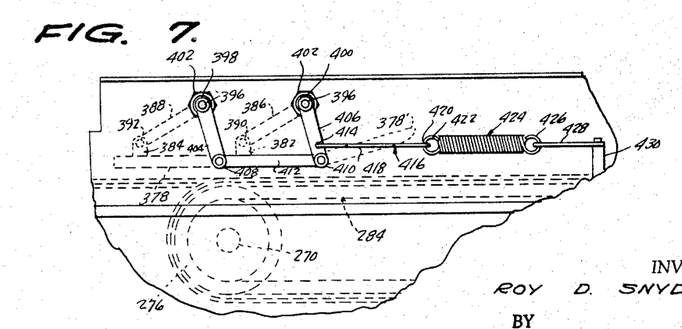
FIGURE 7 is an enlarged fragmentary elevational view, FIGURE 7 being taken on the inclined plane of line 7—7 of FIGURE 5, looking in the direction of the arrows.

The arrangement is such, reference being made to FIGURE 7, that the helicoidal spring 424 constantly tends to bias the link 404, 406 for movement in a counter-clockwise direction, and in so moving, causes the links 386, 388 to turn in the same direction whereby the channel-shaped member 374 is caused to move downwardly in the direction of the platforms 304.

Reference numeral 432 designates, in general, an elongated substantially rectangular meat-readying platform having a substantially L-shaped configuration. As is seen in FIGURES 1, 5 and 6, the meat-readying platform 432 comprises a normally horizontal elongated substantially rectangular base plate which is supported adjacent its front and rear ends on the elongated substantially rectangular first and second bars 32, 34, and its front side by the third bar 36. Additionally, the base plate 432 is supported on the upper edges of the normally horizontal stringers 310. The meat-readying platform 432 serves as means for holding meat to be sliced in reserve to replenish the meat disposed on the two-piece trough 322 as the supply of the meat therein becomes diminished. As is clearly illustrated in FIGURES 5 and 6, the meat-readying platform 432 includes a normally vertically-extending back wall 436 which hooks, releasably, behind the depending flange 336, and the lower end of the back wall 436 is integral with the inner longitudinally-extending marginal edge of the base plate 434.

Also secured to the stringers 310, as by bolts 440, is an elongated substantially Z-shaped shield 438, the bolts 440 extending through the upper longitudinally-extending flange 442 having a rectangular configuration, one of the marginal edges of the flange 442 being integrally-connected with a depending bight 444, the lower end of which terminates in an upwardly-turned longitudinally-extending substantially rectangular flange 446 which extends below the underside of the return portion of the conveyor platforms 304 in spaced relationship relative thereto. It will also be noted that the platforms 304 on the return side thereof are maintained in spaced relationship relative to the bar 52.

Reference numeral 448 connotes an elongated L-shaped bracket having an upwardly-inclined substantially rectangular foot section 450 and an integrally-formed substantially rectangular leg section 452. Bolts 454 secure the foot section 450 to the trough support rear closure plate 30 with the leg section 452 extending outwardly therefrom. The bracket 448 is reinforced by a web 454 which is integral with the leg and foot sections 452, 450, respectively, the web 454 being integral therewith and extending intermediate the sides thereof.

Projecting upwardly and away from the leg section 452 are three bearing blocks 456, 458 and 460, the bearing blocks being disposed in longitudinally-spaced relationship relative to one another and with the bearing block 458 being proximate the bearing block 456 and remotely-disposed relative to the bearing block 460.

Denoted by reference numeral 462 is a conventional pneumatic drive motor which is connected through suitable means with reduction gearing generally designated by reference numeral 464 (see FIGURE 3), the reduction gearing 466 being fixedly secured to the bearing block 456 by conventional means (not shown) and held against rotation by means of a lug 468 integral with the reduction gearing casing 465 and fixedly secured to the bearing block 456 by conventional means.

The output shaft 470 of the gear reduction unit 465 is fixedly secured to a drive pulley 472 which extends through, and is rotatably journaled within the bearing block 456. As is seen in FIGURE 3 of the drawings, the drive pulley 472 is disposed intermediate the bearing blocks 456, 458.

Reference numeral 474 designates, in general, a knife rocker arm having an elongated substantially rectangular configuration. The knife rocker arm 474 includes a pair of substantially hollow cylindrical journals 476, 478 disposed at the remotely-located ends thereof and having substantially parallel longitudinally-extending axes. The journals 476, 478 are held in longitudinally-spaced relationship by means of a pair of longitudinally-spaced confronting and parallel support arms 480, 482, the support arms 480, 482 being integrally-constructed with the journals 476, 478. The lowermost one of the journals 476, 478 (see FIGURE 3) has inserted in the opposed ends thereof a pair of bushings 484, 486, see FIGURES 3 and 9, through which the opposed ends of a shaft 488 extend, the opposed ends of the shaft 488 being secured within the bearing blocks 458, 460. Thus, it is now seen that the knife rocker arm 474 is free to rotate about the shaft 488. Disposed within the upper journal 476, and at the opposed ends thereof, are a pair of bushings 500 (see FIGURE 9) similar in construction with respect to the bushings 484, 486, and in which are journalled for rotation the opposed ends of an elongated cylindrical shaft 502. One end of the shaft 502 has fixedly secured thereto a pulley 504 aligned with the pulley 472 (see FIGURE 3), and about these two pulleys is trained and endless pulley belt 506. Fixedly secured to the other end of the shaft 502, as by a set screw 508, is a stepped collar 510 (see FIGURE 8). A plurality of countersunk screws 512 serve to connect a rotatable knife blade 514 with the collar 510, the knife blade 514 having a disc-like configuration and being provided with a forwardly-facing concave side. Thus, activation of the drive motor 462 will cause rotation of the drive pulley 472 which, through the endless belt 506 effects rotation of the driven pulley 504, and the latter, in turn, through the shaft 502 will cause the knife blade 514 to rotate.

Reference numeral 516 indicates an elongated upright spacer rib (see FIGURE 1), the lower end of the spacer rib being fixedly secured to the rear end of the third bar 36. The spacer rib 516 has a greater thickness than the bearing block 460, and to each is secured a rear knife guard casing 518 which is secured thereto as by bolts 519. The rear guard casing 518 extends between the bearing block 460 and an arm 520 integrally-connected at one of its ends with the journal 478, the function of the arm 520 to be detailed below. Reference numeral 522 designates a front knife guard casing which may be detachably connected with the rear knife guard casing 518 through any conventional and desirable means (not shown). It will be understood, of course, that the front knife guard casing 522 is so constructed as to leave exposed an arcuate portion of the cutting knife or blade 514 in order that the latter may serve its intended function.

The rear knife guard casing 518 is provided with an arcuate slot 524' (see FIGURE 2) through which extends the stepped-down collar 510 whereby the position of the knife blade 514 may be moved angularly about the shaft 488 within the rear and front knife guard casings 518, 522.

Reference numeral 524 designates a boss which depends from the underside of the journal 478, the longitudinal axis of the boss 524 being disposed at an obtuse angle with respect to the longitudinal axis of the arm 520. As is seen in FIGURE 8, the longitudinal axis of the arm 520 and of the boss 524 are substantially coplanar and are contained in a plane normal to a horizontal plane.

Figure 8:
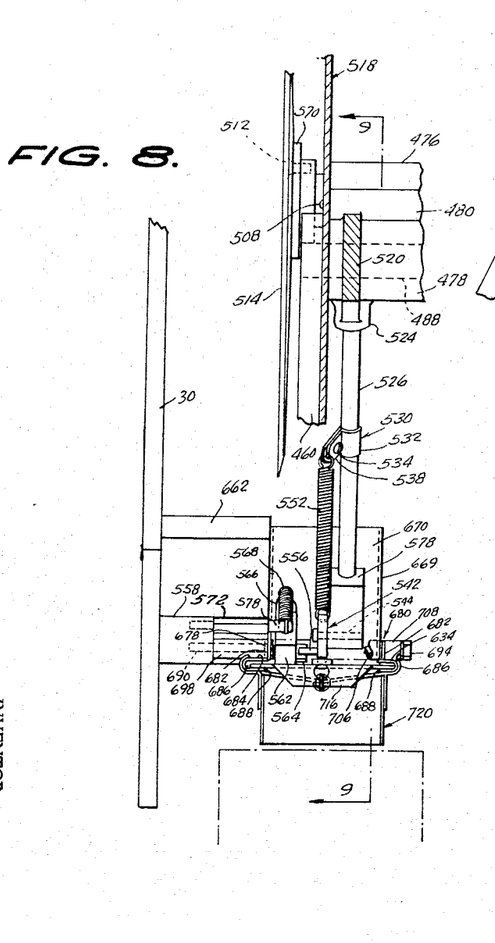
FIGURE 8 is a fragmentary rear end side elevational view, partly in section, FIGURE 8 being taken on the line 8—8 of FIGURE 2, looking in the direction of the arrows.
Figure 9:
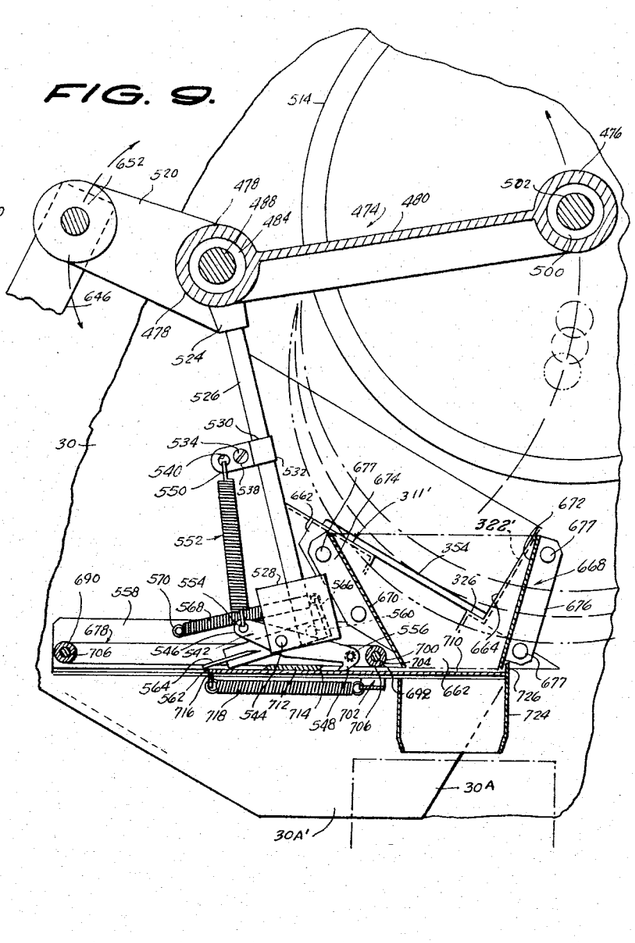
FIGURE 9 is an enlarged fragmentary side elevational view, FIGURE 9 being taken substantially on the vertical plane of line 9—9 of FIGURE 8, looking in the direction of the arrows.

Fixedly secured within the boss 524 is one end of an elongated substantially cylindrical shaft 526, the other end of the shaft being fixedly secured within a shutter pawl carrier block 528 (see FIGURE 9). Reference numeral 530 designates, in general, a conventional clamp bracket having a clamp bracket barrel 532 slidably and adjustable mounted on the shaft 526, the clamp bracket barrel 532 being secured in its adjusted position by means of the screw 534 which is threaded through a pair of juxtaposed arms 536, 538, of which the arm 538 is formed with a transversely-extending opening 540 adjacent the outer end thereof. As is seen in FIGURE 8, the arms 536, 538 are not equal in length, the arm 538 being the longer of the two to serve a function to be described.

Reference numeral 542 designates, in general, a bell-shaped pawl, the pawl 542 being pivotally connected on pivot pin 544 to the shutter pawl carrier block 528 adjacent the lower left-hand corner thereof with reference to FIGURE 9 of the drawings. As is seen in this figure, the pivot pin 544 engages the bell-shaped pawl 542 at an intermediate end thereof, and, as is seen in this figure, one of the remotely-disposed ends of the bell-shaped pawl 542 is provided with an opening 546, and the other remotely-disposed end of the bell-shaped pawl 542 is provided with a downwardly-extending nib 548. The final convolution 550 of an elongated helicoidal spring 552 is threaded through the opening 540 of the clamp bracket arm 538, and the final lower convolution 554 of the helicoidal spring 552 is threaded through the opening 546. Thus, it is seen, reference again being made to FIGURE 9 of the drawings, that the bell-shaped pawl 542 is constantly biased for rotation about the pivot pin 544 in a clockwise direction.

As is seen in FIGURE 8 of the drawings, a pin 556 is carried on the bell-shaped pawl 542 adjacent the nib 548 thereof, the pin 556 projecting laterally and inwardly toward the rear end of the machine 20.

Reference numeral 558 denotes an elongated substantially rectangular traverse bar fixedly secured to the rear end trough support closure plate 30 and projecting outwardly therefrom. Projecting laterally from the traverse bar 558 is a pivot pin 560 (see FIGURE 9) on which is pivotally mounted, adjacent one of its ends, an elongated substantially rectangular pawl release trigger block 562. The pawl release trigger block 562 is disposed, substantially, in juxtaposition relative to the pin 556, and at that end of the pawl release trigger block 562 remote from the pin 556, the pawl release trigger block 562 is formed with a laterally-projecting arcuate flange 564 disposed in the path of movement of the pin 556 in a manner to be described below. The pawl release trigger block 562, at that end thereof adjacent the pivot pin 560, is formed with an upwardly-extending flange 566 (see FIGURES 8 and 9) to which is anchored to one end of a helicoidal spring 568. The other end of the helicoidal spring 568 connects to a stud 570 of a hexagonal spacer member 572 which is threaded into the traverse bar 558 (see FIGURES 8 and 9).

From the foregoing description, it will be understood that as the shaft 526 pivots in a clockwise direction, the pin 556 will engage and ride underneath the arcuate flange 564, and as the pin 556 passes from under the flange 564 and begins to trace its return path in a contra-clockwise direction, the pin 556 will ride upwardly on the flange 564 causing the bell-shaped pawl 542 to pivot in a counterclockwise direction until the same rides off the upper end of the flange 564 at which time, the nib 548 and the bell-shaped pawl 542 will be pivoted downwardly in the reverse or clockwise direction, all to serve a function to be described. It will be noted that as the pin 556 rides beneath the flange 564, the pawl release trigger block 562 is urged to move in the aforesaid clockwise direction against the tension of the helicoidal spring 568. As the pin 556 passes from beneath the flange 564, the helicoidal spring 568 immediately causes the pawl release trigger block to pivot in a counterclockwise direction to return the same to the full-line position thereof shown in FIGURES 8 and 9.

Reference numeral 574 indicates, in general, a two-piece pulley belt cover comprising a top cover member 576 and a bottom cover member 578. The top cover member 576 is essentially of the closed inverted channel type and includes an elongated bight wall 580 from which depend, at the opposed ends thereof, the end walls 582, 584. The bight 580 and the end walls 582, 584 are integrally-formed with a pair of laterally-spaced and substantially parallel sidewalls 586, 588. In a similar manner, the bottom cover member 578 is provided with a bight wall 590 from the opposed ends of which upwardly project end walls 592, 594, and the bight and end walls 590 and 592, 594, respectively, are integrally-connected at their longitudinally-extending marginal edges by opposed, laterally-spaced and substantially parallel sidewalls 596, 598 (see FIGURES 2 and 12). As is seen in the drawings, the upper ends of the end walls 592, 594 are reverted as at 600, 602 in order to form a frictional contact with the lower ends of the sidewalls 582, 584.

The sidewall 596 is fixedly secured to lugs 604, 606 which project laterally from the support arm 482 and are secured thereto as by bolts 606, 608.

Reference numeral 612 designates a first belt tightener which comprises an elongated substantially rectangular base wall 614 having one of its longitudinally-extending marginal edges provided with a pair of inwardly-extending notches 616, 618, the notches 616, 618 being adapted to engage about the screws or bolts 606, 608. The other longitudinally-extending side of the base wall 614 has integrally-formed therewith an elongated substantially rectangular sidewall 620 which is perpendicular to the base wall 614, the sidewall 620 terminating, at its outer end, in a flange 622 which overhangs the base wall 614 in substantially parallel relationship relative thereto. The arrangement is such that the base wall 614 and the sidewall 620 are located adjacent the longitudinally-extending side edges of the belt 506 and in such a manner that the sidewall 620 engages against the exterior side of the belt 506. Thus, by loosening the screws or bolts 606, 608 the sidewall 620 can be moved toward and away from the exterior side of the adjacent portions of the belt 506 to tighten or loosen the pressure thereon. Thereafter, of course, the bolts are retightened to secure the sidewall 620 in its adjusted position.

Figures 10, 11, 12, 13:
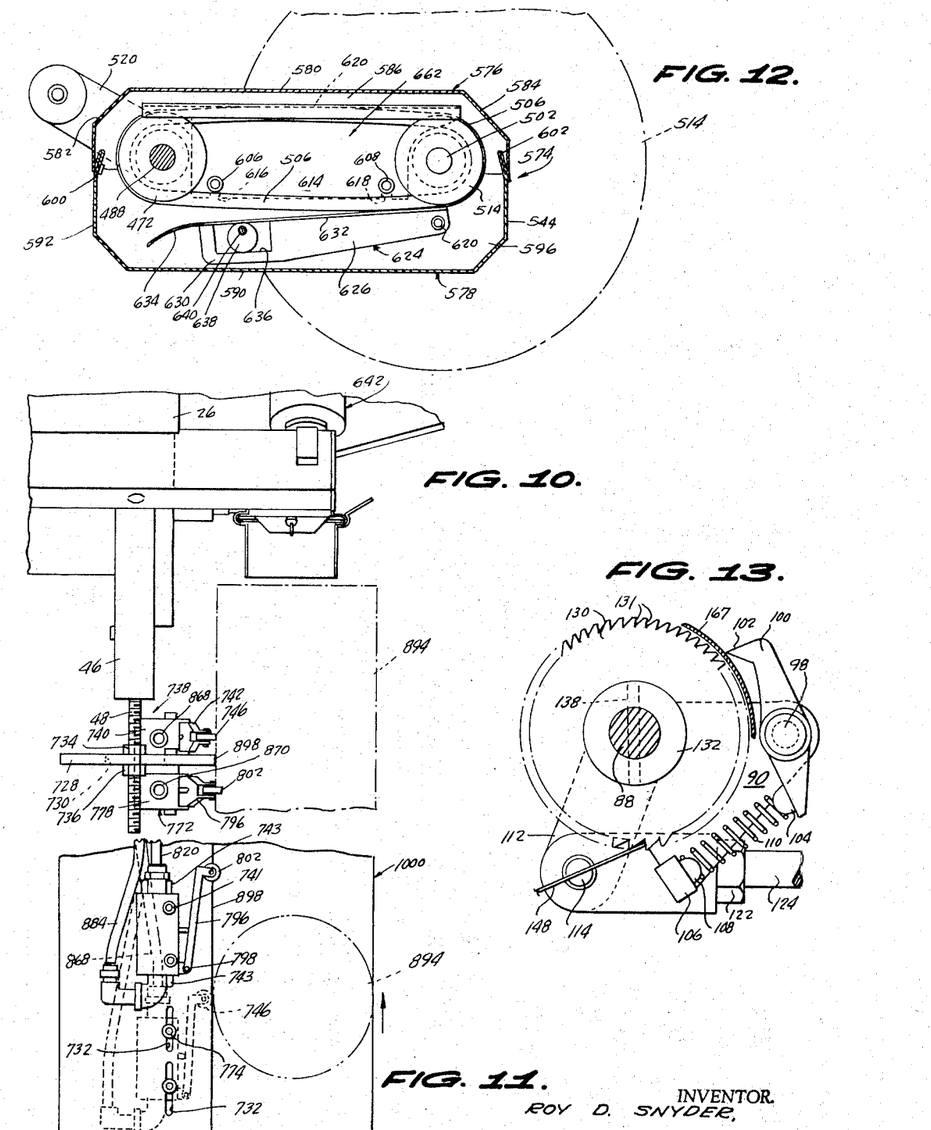
FIGURE 10 is a fragmentary rear side elevational view, FIGURE 10 being taken substantially on the vertical plane of line 10—10 of FIGURE 2, looking in the direction of the arrows.
FIGURE 11 is a fragmentary bottom plan view of the mechanism shown in FIGURE 10, FIGURE 11 being taken substantially on the horizontal plane of line 11—11 of FIGURE 2, looking in the direction of the arrows.
FIGURE 12 is an end elevational view of the belt-driven means for effecting rotation of the slicing or cutting disc together with the means for adjusting the slippage thereof, the housing for the driving and control means being shown in cross-section, FIGURE 12 being taken substantially on the vertical plane of line 12—12 of FIG. 3, looking in the direction of the arrows.
FIGURE 13 is an enlarged cross-sectional view, partly in elevation, illustrating the ratchet feed means for advancing bulk meat toward the cutting or slicing disc together with shield means for preventing the engagement of the ratchet nib with the ratchet teeth over a portion of the periphery thereof, FIGURE 13 being taken substantially on the inclined plane of line 13—13 of FIGURE 6, looking in the direction of the arrows.

Secured to the sidewall 596 is a second belt tightening device 624. As is seen in FIGURE 12, the belt tightening device 624 has a substantially L-shaped configuration and includes an elongated substantially rectangular leg portion 626 which is pivotally connected on a bolt 628 to the sidewall 596 in such a manner as to provide a free end 630. Extending perpendicularly from a longitudinally-extending edge of the second belt tightening device 624 is the foot portion 632 having essentially a substantially rectangular configuration and which terminates, at the leading end thereof, in a downwardly-turned arcuately-shaped flange 634. The free end portion 630 of the leg portion 626 is provided with an elongated substantially rectangular slot 636 in which is mounted an eccentric disc 638, the disc 638 being fixedly secured to a shaft 640 with the connection therebetween being off-center. As is clearly seen in FIGURE 12, the eccentric disc 638 engages at diametrically-opposed sides with the foot portion 632 and the adjacent substantially parallel side of the slot 638. It is thus seen that any turning movement imparted to the disc 638 will cause the corresponding movement of the foot portion 632 and of the second belt tightening device 624 toward and away from the belt 506 with which it is juxtaposed, it being understood, of course, that the foot portion 632 is movable into contact with the exterior side of the belt 506 to apply tension thereon should the belt tightening device 624 be turned in a clockwise direction as viewed in FIGURE 12, and to release the tension on the belt 506 if the belt tightening device 624 is turned in a counterclockwise direction.

Figure 2:
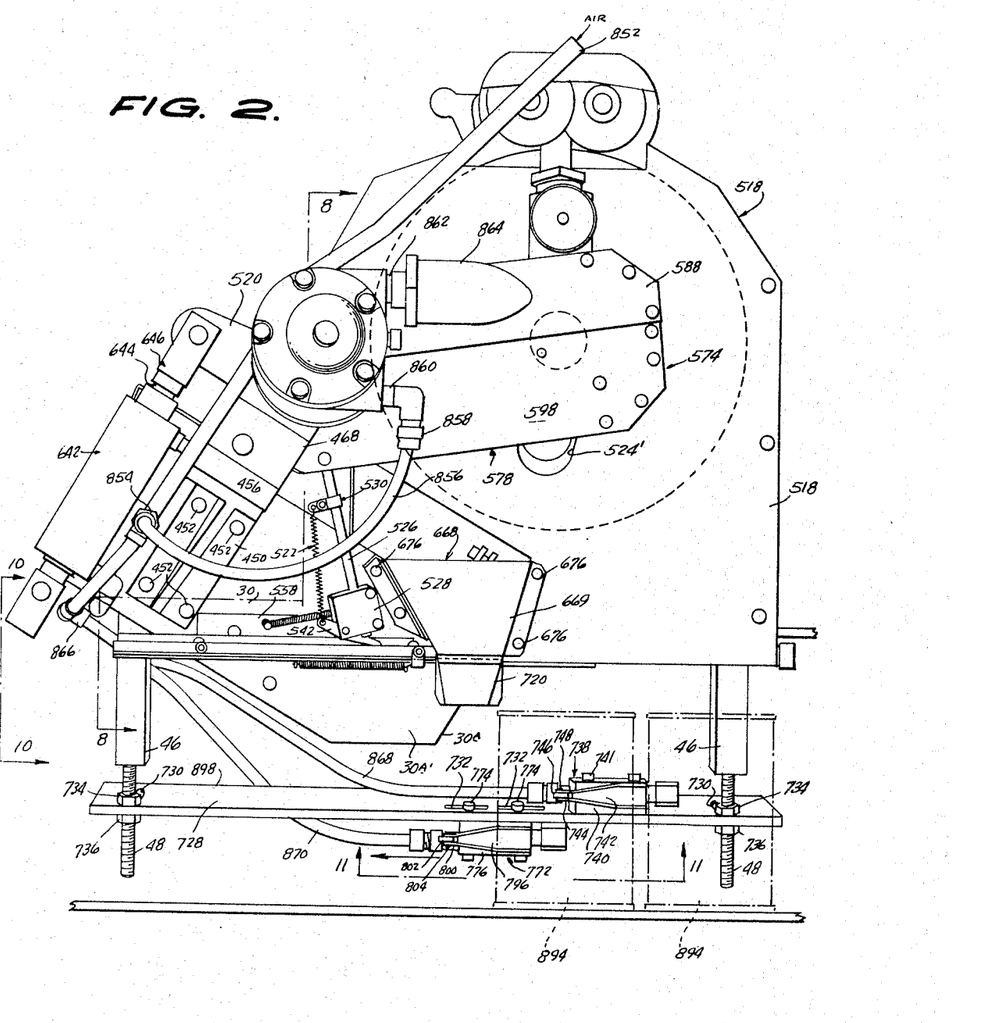
FIGURE 2 is a rear end perspective view of the meat slicing or cutting machine shown in FIGURE 1.

Referring now more specifically to FIGURES 2, 3 and 10, reference numeral 642 designates, in general, a pneumatic cylinder including an extendable and retractable piston rod 644 having one end of an elongated clevis 646 fixedly secured thereto. The other end of the clevis 646 includes the laterally-spaced arms 648, 650 which receive therebetween the outer end of the arm 520, the latter being pivotally connected thereto on a pivot pin 652 (see FIGURE 3). To the underside of the trough support arm 26 is fixedly connected an elongated substantially rectangular bar 654 (see FIGURE 3) having a downwardly-opening slot 656 formed therein to receive a lug 658 secured to the pneumatic cylinder 642 at that end thereof opposed to the piston rod 644. The lug 658 is pivotally connected to the bar 654 as by the pivot bolt 660.

It is thus seen that as the air is admitted to opposite ends of the pneumatic cylinder 642, the piston rod will be, alternately, forced to extend from the pneumatic cylinder 642 or to be retracted therein, and in so moving, to turn the arm 520 (see FIGURE 2) in a clockwise or counter-clockwise direction, respectively. The movement of the rocker arm 474 effects, of course, the oscillatory movement of the slicing or cutting knife disc 514.

Fixedly secured to the trough support end closure plate 30 and projecting laterally therefrom is a trough rear end support block 662 having a downwardly-opening substantially V-shaped slot 664 formed therein to receive the rear terminal end portion 322' of the two-piece trough 322 that projects beyond the support trough end closure plate 30.

Reference numeral 668 designates a hollow guide which comprises an inverted frusto-triangular back stop plate 669 laterally-spaced and substantially parallel to the trough rear end support block 662, and from the downwardly-converging marginal edges of which laterally and inwardly-project integrally-formed and opposed sidewalls 670, 672 which, at the respective inner ends terminate in outwardly-turned diverging flanges 674, 676 secured to the support block 662 and to the rear knife guard plate 578 as by bolts 677.

Reference numerals 678, 680 (see FIGURES 8 and 9) generally indicate a pair of laterally-spaced and substantially parallel shutter guard rails having an L-shaped configuration. As is seen in the drawings, each of the shutter guide rails 678, 680 comprises a leg portion 682 which extends substantially parallel to the trough rear end support bar 558, the legs 682 being disposed in laterally-spaced and substantially parallel relationship, one with respect to the other. The leg portions 682 each terminates in a laterally and outwardly-extending diverging foot portion 684, the outer longitudinally-extending edges of the foot portion 684 being reverted as at 686 to continue into elongated slides 688 vertically-spaced and extending parallel to their immediate adjacent and juxtaposed foot portion 684.

Referring now specifically to FIGURES 8 and 9, reference numerals 690, 692 denote a pair of bolts which are adapted to be threaded into the traverse bar 558, the bolts each being provided with a head 694.

Mounted on the inner ends of each of the bolts 690, 692 is a spacer collar 698, only one being shown in FIGURE 8. As is seen in FIGURE 8, the bolts 692 extend transversely through the leg portions 682 of the shutter guide rails 680 and are held in spaced relationship relative to the traverse bar 558 by means of the spacer collars 698. However, in the case of the bolt 692, the opposed legs 700 (only one being shown in FIGURE 9) of a bracket generally indicated by reference numeral 702 are mounted thereon intermediate the outer end of the spacer collar 698 and the adjacent side of the leg 682 of the shutter guide rail 678. The bracket 702 includes a substantially V-shaped bight 704, to which further reference will be made.

Also mounted on each of the bolts 690, 692 are spacer collars 706 which extend between the confronting sides of the legs 682 of the shutter guide rails 678, 680, and interposed between the outer side of the leg 682 of the shutter guide rail 680 and the head 694 of the bolts 690, 692 are additional spacer washers or collars 708.

Referring now more specifically to FIGURE 9 of the drawings, it is seen that the shutter guide rails 678, 680 extend beyond the lower end of the hollow guide 668, on opposite sides thereof (reference being made to FIGURE 8), and that an elongated substantially rectangular shutter 710 is mounted for reciprocation on the shutter guide rails 678, 680 between the feet portions 684 thereof, respectively, and their associated slides 688. Again referring to FIGURE 9 of the drawings, reference numeral 712 designates an elongated substantially rectangular, centrally-located tooth fixedly secured to the upper side of the shutter 710, adjacent the inner end thereof. The tooth 712 is formed with a downwardly and inwardly-extending notch 714 disposed in the path of movement of the bell-shaped pawl 542 and aligned with the nib 548 thereof. The shutter 710 is also provided with a downwardly-depending flange 716 to which one end of a helicoidal spring 718 is fixedly secured. The other end of the helicoidal spring 718 is fixedly secured to the bight 704 of the bracket 702. Thus, and making reference to FIGURE 9 of the drawings, it is seen that the shutter 710 is constantly biased for movement in such a direction as to extend below the lower end of the hollow guide 668 to serve a function to be described.

Reference numeral 720 denotes a hollow guide having a pair of oppositely disposed confronting resilient spring clips 722 fixedly secured thereto adjacent the upper end thereof, the spring clips 722 being adapted to engage against the reverted portions 686 of the shutter guide rails 678, 680 below the lower end of the hollow guide 668. As is seen in FIGURE 9, that end wall 724 which confronts the outer end of the shutter 710 is extended upwardly to provide an abutment 726 to limit the movement of the shutter 710 toward the right, as seen in the last-named figure.

Referring now more specifically to FIGURE 2 of the drawings, reference numeral 728 designates an elongated substantially rectangular micro-valve support platform having a transversely-extending slot 730 adjacent each end thereof, the slots having their major axes disposed parallel to one another. The platform 728, substantially midway between the ends thereof, is provided with a pair of elongated slots 732 having their respective major axes extending parallel to the longitudinal axis of the platform 728, and the major axes of the slots 732 are aligned with one another. As is seen in FIGURE 2 of the drawings, the adjustable leveling screws 48 are adapted to be received, respectively, within one of the slots 730, and the upward movement of the platform 728 relative to each of the adjustment screws 48 is limited by top stop nuts 734, and the downward movement thereof relative to the adjustment screws 48 is limited by the bottom stop nuts 736. The arrangement is such that the platform 728 is clamped between the pairs of top and bottom stop nuts 734, 736 in any desired adjusted position longitudinally of the adjusting screws 48. To serve a purpose to be described infra, either one of the nuts 734, 736 may be loosened to permit the platform 728 to be moved in a direction substantially perpendicular to the longitudinal axis of the adjusting screws 48 thereby providing for the lateral shifting of the platform 728 toward and away from the machine 20.

Reference numeral 738 denotes a conventional pneumatic micro-valve switch which is fixedly secured, by conventional means (not shown) to the upper side of the platform 728. The micro-switch 738 includes an elongated substantially hollow rectangular main body portion 740 on which is pivotally secured one of the ends of an elongated switch arm 742 having a bifurcated end 744 between the arms of which is mounted a cam sensing roller 746 pivotally secured therebetween on pivot pin 748. The main body portion 740 includes an internal elongated substantially hollow chamber 750 (see FIGURE 14) in which is mounted for reciprocation an elongated valve 752.

As is seen in FIGURE 14, the valve 752 includes a recess or passageway 754 which extends axially thereof, intermediate its ends to give rise to air stop baffle plates 756, 758 at each end of the passageway 754. The main body portion 740 also includes an air inlet port 760 at one end of the valve 752, and a pair of air outlet ports 762, 764.

With the understanding that the diagram of the pneumatic system illustrated in FIGURE 4 is schematic throughout, it is seen that the switch lever arm 742 is, in the nature of a valve crank lever, the arm being pivotally mounted on a pivot pin 766 supported on the main body portion 740, and the bell-crank lever is provided with a second arm 768 which extends into the chamber 750 to terminate within a suitable socket formed in the valve 752. Thus, as the arm 742 pivots about the pivot pin 766, pivotal movement in a clockwise direction will cause the second arm 768 to pivot in a similar direction whereby the valve 752 is moved horizontally to the right, as viewed in FIGURE 14, and the movement of the arm 742 in a contraclockwise direction will cause the valve 752 to move to its original position as illustrated in FIGURE 14. A resilient spring 770 may be interposed between the switch arm 742 and the main body portion 740 in such a manner as to constantly bias switch arm 742 for movement in a contraclockwise direction.

A second pneumatic valve micro-switch 772 (see FIGURE 2) is adjustably secured to the underside of the platform 728, the adjustment of the micro-switch 772 being accomplished by means of bolts 774 which extend through the slots 732 formed in the platform 728. The inner ends of the bolts 774 are threaded into the main body portion 776 of the micro-valve 772, and in all other respects the micro-switch 772 is identical in construction with respect to the micro-switch 738. Thus, the main body portion of the micro-switch 772 is provided with an internal longitudinally-extending chamber 778 which receives for reciprocation therein an elongated valve 780 having a longitudinally-extending passageway 782 formed therein intermediate its opposed ends, the passageway 782 being closed at its opposed ends by air baffle plates, 784, 786. One end of the main body portion 776 is provided with an air inlet port 788, and the main body portion is also provided with a pair of air inlet ports 790, 792. As before, the bell-crank lever 794 includes an elongated switch arm 796 pivoted on pivot pin 798 to the main body portion 776, and the outer end of the switch arm 796 is bifurcated at its outer end 800 to rotatably support therein a sensing roller 802 carried thereon on pivot pin 803. The other arm 804 of the bell-crank lever 794 engages within a suitable notch formed in the valve 780 whereby rotation of the switch arm 796 in a clockwise direction as viewed in FIGURE 14 will force the valve 780 to move from the position shown therein toward the right-hand end of the chamber 778. Movement of the switch arm 796 in the reverse or contraclockwise direction will cause the valve 780 to move in the opposite direction and to take the position shown in FIGURE 14.

Again referring to FIGURE 14, reference numeral 806 designates, in general, a conventional master valve for the pneumatic system illustrated therein. The master control valve includes a flanged main body portion 808 (see FIGURES 3 and 14) bolted as at 810 to the underside of the arm 26 intermediate the ends thereof. The main body portion 808 includes a pair of oppositely-disposed spaced and aligned air ports 812, 814 which are in open communication with a pair of air passages 816, 818, respectively, at their respective outer ends. The inner ends of the air passages 816, 818 open upwardly through the plane of the upper side 820 of the main body portion 808. The main body portion 808 also includes a port 822 which vents to the atmosphere at one of its respective ends, and at its other end connects with the inner end of a passage 824 which opens at its other end into the plane of surface 820 of the main body portion 808.

Reference numeral 826 designates, in general, an elongated substantially rectangular hollow cap releasably secured, by conventional means not shown, to the upper side 820 of the master valve 806. As is seen in FIGURE 14, the cap 826 includes a substantially hollow rectangular chamber which opens downwardly toward the upper side 820 of the master valve 806, and it will be seen and understood that the peripheral walls of the cap 826 encompass the upper ends of the passages 816, 818 and 824.

Extending transversely across the chamber 828 and fixedly secured to the sidewalls defining the same is an elongated substantially rectangular divider plate 830 having a longitudinally-extending slot 832 formed therein extending transversely therethrough. The divider plate 830 divides the chamber 828 into upper and lower chambers 834, 836, respectively. The lower chamber 836 being disposed immediately adacent the upper side or surface 820 of the main body portion 808. Mounted for reciprocation within the lower chamber 836 between the divider plate 830 and the upper side 820 of the master control vlave 806 is a slide valve 838 having a top wall 840 from the opposed ends of which depend flanges 842, 844 which slidably engage the upper side 820 of the master valve 806. Fixedly secured to the top wall 840 and extending through the slot 832 is a pin 846. The pin 846, at its upper end is secured within an elongated piston 847 mounted for reciprocation within the chamber 838. One of the sidewalls 848 of the cap 826 is provided with an air inlet port 850 which is in open communication with the chamber 836 below the top wall 840 of the slide valve 838, and as is seen in FIGURE 14, the flanges 842, 844 are so spaced as to place the port 850 into open communication with the passage 818 when the slide valve 838 is in the position shown in FIGURE 14, and when the slide valve 838 is moved to the left as viewed in FIGURE 14, the flanges 842, 844 cut off the supply of air to the passage 818 and connect the port 850 with the passage 816.

Reference numeral 852 connotes an elongated substantially hollow tubular header, reference still being made to FIGURE 14 of the drawings, which is connected at one of its ends with a source of air under compression. The header 852 connects through a suitable coupling 854 with one end of a branch conduit 856 (see FIGURE 2), and the other end of the branch conduit 856 connects through coupler 858 with the inlet port 860 of the air motor 462. The spent air from the motor 462 exhausts through the air outlet or exhaust conduit 862 which is connected at its outer end with a conventional muffler device 864 (see FIGURE 2). The air header 852 connects through a T-connector 866 with a second branch conduit 868, the second branch conduit being connected with the air inlet port 760 (see FIGURE 4). The air header 852 further connects through a suitable T-coupler (not shown) with a third branch conduit 870 adjacent one of its ends, the other end of the third branch conduit 870 being connected with the port 788. The other end of the header 852 connects with the port 850 through a fourth branch conduit 872.

An elongated substantially hollow tubular conduit 874 has one of its ends connected to the port 762 of the micro-valve switch 738, and the other end of the conduit 874 connects with the port 876 formed in the cap 826 adjacent one end of the piston 847 which confronts the port 876.

One end of an elongated substantially hollow tubular conduit 878 connects with the port 790 of the micro-switch valve 772, the other end of the conduit 878 being connected with a port formed in the cap 826 and opening at its inner end in confronting relation relative to the other side of the piston 847.

With the valves 752, 780 in their respective positions shown in FIGURE 14, the passageway 754 places the port 762 in open communication with the port 882 of the micro-switch valve 732 whereby air passing into the port 762 is vented to the atmosphere through the conduit 884. When, however, the valve 752 moves to the right-hand end of the main body portion 740 this connection is destroyed and the ports 760, 762 are placed in open communication, one with the other. In a similar manner, with the valve 780 in its left-hand position as is shown in FIGURE 14, the port 790 is placed in open communication through the passageway 782 with the port 792 and with the vent conduit 886.

Reference numeral 887 denotes an elongated conduit having its opposed ends connected to the bottom sides of the pneumatic cylinders 126, 642, and the conduit 887 connects through a conduit 888 with the port 812 of the main body portion 808 of the master valve 806. The upper sides of the pneumatic cylinders 126, 642 connect through a conduit 890 with a conduit 892 with the port 814 of the main body portion 808 of the master valve 806. For the purpose of clarity, the "upper" and "lower" sides of the pneumatic cylinders 126, 642 are defined as comprising the chambers disposed between the piston of each of the pneumatic cylinders adjacent the piston rod ends thereof, and the chamber which is disposed on the other side of the piston adjacent the pivotal connection of each of the pneumatic cylinders with their respective supports.

Reference numeral 894 (see FIGURES 2, 10 and 11) denotes one of a plurality of containers or receptacles having open upper ends through which is to be introduced sliced portions of bulk meat, each sliced portion having a constant volume. The containers or receptacles 894 have their respective lower ends supported on conveying means (not shown) which cause the containers or receptacles to move in a direction perpendicular to the longitudinal axis of the machine 20 and to pass below the extension 720 of the guide 668 in the direction of the arrow shown in FIGURE 2. In so moving, the outer side of each of the containers or receptacles 894 engages the outer edge 898 of the platform 728 (see FIGURES 2, 10 and 11). As is clearly seen in FIGURES 10 and 11, the arrangement and disposition of the microswitches 738, 772 are such that their respective rollers 746, 802 project beyond the edge 898 of the platform 728 to sense the containers or receptacles 894 as the same pass thereby.

Having described and illustrated one embodiment of this invention in detail, a brief summary of the operation thereof is set forth below.

Let it be assumed that all of the component elements cooperating with one another to constitute the meat-slicing machine 20 are in their respective full-line positions as is shown throughout the figures, and let it further be assumed that air under pressure is passing through the header conduit 852. Let it further be assumed that meat in block form such as, for example, slab bacon, has been placed on the two-piece trough 322 in such a manner as to rest upon the back wall 324 and the bottom wall 338 and that the block or slab of bacon extends across the platforms 304 and is engaged by the pointed ends 308 of the rivets 306 which project outwardly and laterally away therefrom.

Let it also be assumed that the conveyor (not shown) includes a conveyor belt 1000 upon which are placed the containers or receptacles 894 which are to receive slices of meat having a constant volume. The conveying means for the receptacles or containers 894 may be of any conventional type and do not form any part of the instant invention. Assuming that the conveyor belt 1000 is running in the direction of the arrow shown in FIGURE 2, and also in FIGURE 11, and the motor 462 is being driven, as the first of the receptacles or containers 894 engages the sensing roller 746 of the micro-valve switch 738 (see FIGURES 2 and 10), the switch arm 742 pivots in a clockwise direction (reference being made to FIGURE 14) whereby the valve 752 is moved from the position shown in FIGURE 14 to the left-hand side of main body portion 740 whereby the port 760 is placed into open communication with the port 762. Air under pressure now passes from the header 852 through the branch conduit 868 and through the conduit 874 from whence it passes through the port 876 of the cap 826 to impinge against the piston 847 to maintain the same in its position shown in FIGURE 14. Under these conditions, the port 850 is in open communication with the passage 818 which, through its port 814 supplies air under pressure to the conduit 892, and from the conduit 892 into the upper end of the ratchet cylinder 126 and into the upper end of the knife cylinder 642. The piston rods 124, 644 are thus maintained in their retracted positions. Under these circumstances, the ratchet pawl 100 has been moved through an arc representing its maximum throw in a clockwise direction, reference being made to FIGURE 3 of the drawings, and, consequently, the platforms 304 mounted on the conveyor chain 284 have moved its maximum distance and have halted.

Simultaneously with this movement of the piston rod 124, the retraction of the piston rod 644 has caused the rocker arm 474 to pivot to its maximum high position preparatory to the reverse movement thereof to effect the cutting or slicing operation.

Now, as the first of the containers or receptacles 894 passes beyond the sensing roller 746, the switch arm 742 pivots in a counterclockwise direction under the influence of the bias of the spring 770, and in so turning, causes the valve 752 to return to the position shown in FIGURE 14, thereby destroying communication between the conduits 868 and 874, and that portion of the chamber 834 extending between the port 876 and the adjacent end of the piston 847 is now vented to the atmosphere through the conduit 874, the port 762, the passage 754, and the conduit 884.

The first of the containers or receptacles 894 now engages the sensing roller 802 and effects a turning movement of the switch arm 796 of the micro-valve switch 794 in a clockwise direction to cause the valve 780 to shift to the right-hand side of the main body portion 776, reference being made to FIGURE 14. Air under pressure now passes through the header 852, the branch conduit 870, the port 888 and into the main body portion 776 from whence it passes through the port 790, the conduit 878, the port 880 to impinge against the adjacent side of the piston 847 to cause the same to shift to the left as viewed in FIGURE 14, whereby communication between the port 850, the passage 818 is cut off, and communication between the port 850 and the passage 816 is established. Air under pressure passes from the passage 816 into the port 812, and thence into the conduit 888 and into the conduit 887 from whence it is led into the lower ends of the ratchet and knife cylinders 126, 642, respectively.

The piston rod 124 is now extended to turn the arm 112 through an arc in a counterclockwise direction causing the ratchet pawl 100 to turn in a corresponding direction whereby the nib 102 of the ratchet pawl 100 is caused to escape over the teeth 131 and to engage and ride upon the shield 167, in the manner shown in FIGURE 13, whereby the nib 102 is prepared for its next arcuate movement in the reverse direction to effect the next turning movement of the ratchet wheel 130 to cause the next advancement of the platforms 304.

As this movement of the piston 124 takes place, the piston rod 644 in moving to its outermost position, turns the arm 520 in a clockwise direction, reference being made to FIGURE 9, to initiate the cutting swing. The rocker arm 474, in so moving carries the cutting knife or disc 514 downwardly and across the outer terminal end of the extension 322' of the trough 322 (see FIGURE 9). The outer end of the extension 322' comprises a stationary plate which cooperates with the cutting knife or disc 514 to effect the severing operation of a piece of meat from its bulk.

At this point it is important to note that the center line distance between the longitudinal axes of the shafts 488 and 502, and the radius of the cutting knife or disc 514 are precalculated so that the inner lower corner of the block of meat which extends beyond the terminal end of the trough 322' into the path of the cutting knife or disc 514 immediately adjacent the back wall 324' and flange 326' comprises the last portion of the meat to be severed, and this, in turn, inherently gives rise to a downward thrust on the completely sliced piece or portion of the bulk food so that the same will descend within the guide member 668. This is, of considerable importance, since the severance of the portion from the block food must be not only quickly accomplished, but added impetus to its descent through the guide member 668 must be imparted thereto over and above the force of gravity since the containers or receptacles are fed below the guide member 668 and its extension 720 at an extremely high rate, and in the range of approximately 200 containers or receptacles per minute.

As the rocker arm 474 moves downwardly in a clockwise direction with reference to FIGURE 9, and during the cutting stroke of the knife or disc 514, the shaft 526 is imparted an arcuate movement in the same direction. As the cutting movement of the cutting knife or disc 514 is initiated, the shutter 710 is in the position shown in FIGURE 9, that is, the shutter 710 extends across the lower end of the guide member 668 and over the upper end of its extension 720. Now the swinging movement of the shaft 526 to the left as viewed in FIGURE 9 causes the nib 548 of the bell-crank lever 542 to engage within the notch 714 of the tooth 712, and continued swinging movement of the shaft 526 in the aforesaid direction causes the shutter to be withdrawn to the left against the tension of the helicoidal spring 718 and to establish communication between the lower end of the guide member 668 and the upper end of its extension 720. Thus, the severed piece of meat is free to pass through the guide member 668, the extension 720 and into the open upper end of the first of the containers or receptacles 894.

As the bell-crank lever 542 together with the shutter 710 is moved to the left as viewed in FIGURE 9, the pin 556 passes below the arcuate flange 564 causing the pawl release trigger block 562 to pivot, clockwise, about its pin 560. This pivotal movement of the pawl release trigger block 562 is accomplished against the tension of the helicoidal spring 568, and as soon as the pin 556 clears the outermost end of the flange 564, the helicoidal spring 568 exerts its force to cause the pawl release trigger block 562 to pivot in a counterclockwise direction to assume the position shown in FIGURE 9.

The relationship between the several described elements immediately above is maintained until the cutting knife or disc 514 has reached the end of its cutting or slicing movement and, correspondingly, the shaft 526 no longer moves in its clockwise direction. This movement is, of course, terminated when the piston rod 644 of the knife cylinder 642 is fully extended.

As the container or receptacle continues to move, it escapes the roller 202 permitting the switch arm 796 to turn in a counterclockwise direction under the influence of its spring 807, and valve 780 is thus returned to its position shown in FIGURE 14 to disrupt communication between the branch conduit 870 and the conduit 878 and venting the conduit 878 through the port 790, the passage 874, the port 792 and the conduit 886 to the atmosphere.

The micro-valve switches 742 and 794 are now readied for the next sequence of their respective operations as the second and succeeding containers or receptacles 894 pass thereby in sequence.

When pressure is applied through conduit 890 to the upper ends of the pneumatic cylinders 126, 642, it will be understood that the air on the lower ends thereof is exhausted through the conduit 887, the conduit 888, the port 812, passage 816, and through a passage (not shown) to the exhaust port 822 where this spent air is vented to the atmosphere. In a similar manner, when the conduits 888 and 887 are supplying air under pressure to the lower ends of the pneumatic cylinders 126, 642, air is vented from the upper ends thereof through the conduits 890, 892, the port 814, passage 818, and through a passage (not shown) to the port 822 where this spent air is discharged to the atomsphere.

As has been mentioned above, the master valve 806 is of conventional construction and may comprise the model M manufactured by The Mead Fluid Dynamics, located at 4114 N. Knox Ave., Chicago, 41, Ill.

The "upper" and "lower" ends of the pneumatic cylinders 126, 642 are herein defined as comprising the chambers which lie on that side of the piston (not shown) of each of the cylinders adjacent the piston rod of each pneumatic cylinder, and that chamber which exists between the opposite side of the piston and the base or connected end of the pneumatic cylinder to a given support, respectively.

Now, as the second of the containers or receptacles passes by the sensing roller 746 to urge the same for movement in a clockwise direction in the manner described above, the air under pressure which passes through the conduit 874 impinges against the adjacent end of the piston 874 to drive the same to the right as shown in FIGURE 14. The piston rod 124 begins its retraction movement, causing the ratchet pawl 100 to advance the ratchet wheel 130 to feed the second and succeeding volumes of meat toward the cutting knife or disc 514 while, at the same time, the piston rod 644 begins its movement in the reverse direction, that is, in such a manner as to be retracted within the pneumatic cylinder 642, and this, in turn, causes rotation of the arm 520 in a counterclockwise direction, reference being made to FIGURE 9, whereby the rocker arm 470 is turned in a corresponding direction causing the same to move toward its uppermost and inoperative position.

As this movement of the rocker arm 474 takes place, the shaft 526 moves in the same direction and carries with it the bell-shaped pawl 542. For a short distance of this movement, the tooth 712 will follow the nib 548 of the pawl 542 to maintain the nib 548 within the notch 714. However, as this movement continues, the pin 556 will strike against the flange 564 and ride upwardly thereon until it reaches the upper end thereof as viewed in FIGURE 9, and in so riding, will cause the bell-shaped pawl 542 to pivot in a counterclockwise direction about its pivot pin 544 against the tension of the spring 552. As the pivoting movement of the pawl 542 takes place, the nib 548 escapes from the notch 714, thereby freeing the shutter 710 for movement to the right as viewed in FIGURE 9, whereby the shutter 710 is again extended between the lower end of the guide member 668 and the upper end of its extension 720 under the influence of the spring 718. Continued movement of the shaft 526 causes the pin 556 to ride off the upper end of the flange 564 and carry the nib 548 beyond the notch 714 of the tooth 712 and, under the influence of the spring 552, the bell-shaped pawl 542 pivots around its pin 544 to assume the position shown in FIGURE 9.

As has been explained above, one of the objects of this invention is to provide a slicing machine for constantly cutting slices of meat or other good products in the slab or bulk form, the slices having a substantially constant volume, one with respect to the other. Much trouble is encompassed by present day slicing machines in maintaining this constant volume from slice-to-slice, and the problem becomes more acute as the slicing machines finish taking the final slice of constant volume from the slab of meat leaving only the tail end portion thereof to be presented to the cutting knife or blade 514. This trailing piece usually comprises a piece of reduced width, and volumetrically speaking, a lesser volume than is desirable to be dispensed into the container or receptacle 894 awaiting the next slice, and means are provided herein correcting this inadequacy, said means comprising the movable pawl shield 167. In the instant machine, it is contemplated that the platforms 304 will be loaded with slabs or blocks of meat in end-to-end relation. Thus, as the tines or pointed ends 308 of the platforms 304 convey the last piece of meat from the first slab or block thereof onto the extension 322' of the trough 322, the offset end 370 of the meat sensing lever 366 will sense the reduction in width and adjust the pawl shield 167 accordingly, and will sense the line of demarcation between the trailing end of the first slab or block and the beginning of the second slab or block of meat, and as the leading end of the second block of meat is fed toward the cutting blade or disc 514 the leading end of the second slab or block of meat forces the trailing end of the first slab or block over the outer end of the extension 322' and will continue to track the same until a sufficient volume of the leading end of the second slab or block of meat sufficient in volume to make up the deficient volume of the trailing end of the first slab or block of meat is presented to the disc 514. The trailing end piece of the first slab or block of meat when pushed by the leading end of the second slab or block, falls from the extension 322' onto the shutter 710. Changes in transverse width of the slab of meat are sensed by member 366 and produce adjustments of the pawl shield 167 which change the effective driving stroke of pawl 100 on ratchet wheel 130 in a manner to substantially compensate for said changes in transverse width and to maintain substantially constant volume of the cut slices. The meat slabs are of substantially constant height.

Now, as the shutter 710 is actuated to cause the same to be withdrawn from across the lower end of the guide 668, the trailing end of the first slab or block is engaged by the sidewall 760 which scrapes the same therefrom so that it, together with the first slice of the second slab may fall downwardly through the extension 724 of the guide member 668 and into the waiting one of the receptacles 894. The above-described operations are repeated, cyclically, until all of the slabs or blocks of meat have been sliced.

It has been noted above that the machine 20 is designed to slice slabs of meat into given volumetric pieces of uniform size to fill containers or receptacles at the rate of aproximately 200 per minute. This is, of course, high-speed operation, and it is necessary that the cutting knife or disc 514 complete its downward and upward movement (its complete cycle) a corresponding number of times per minute.

Under tested conditons, it has been found that an optimum speed of the cutting knife or disc 514 is approximately 200 r.p.m., the same as the output shaft 470 of the reduction gear box 465. At the same time, the shaft 502 on which the knife or disc 514 is mounted swings through an arc of substantially 25°, each way, on the shaft 488. Consequently, if there were no belt slippage, the knife would suffer two severe jerks, one tending to stop the movement of the knife, and the other tending to double its speed, this occurring during each full cutting stroke.

With the belt running at this speed, the same will take an elliptical shape having a minor radius at each end and a much longer and flatter curve on the opposed sides thereof. The curve of the belt 506, reference being made to FIGURE 12 of the drawings, and running at the aforementioned speed, will give rise to a substantially parabolic curve at the leading side thereof (that side immediately adjacent the pulley 504 as the belt 506 leaves the same) and an involute curve as the trailing or following side of the belt 506 leaves the pulley 472. It has been found, however, that if these several curves are flattened out in such a manner as to overcome some of the centrifugal force generated through the rotation of the belt 506, then the belt 506 will loosen on the pulleys and provide needed slippage therebetween to largely eliminate or totally prevent the shocks referred to above.

To effect the belt adjustment, the top and bottom cover members 576, 578 are removed and the machine is driven in the conventional manner to effest rotation of the cutting knife or disc 514. If the shocks are severe, it is obvious that more belt slippage is required and to effect a rather coarse adjustment to provide such belt slip, the screws 606, 608 are loosened to permit the belt tightening device 612 to be moved inwardly toward the shafts 488, 502 to effect contact of the leading side of the belt 506 with the sidewall 620. The screws 606, 608 are then re-tightened, the machine again operated, and this operation repeated if necessary to achieve the maximum adjustment. When the adjustment is substantially satisfactory, final adjustment may be made through the use of the second belt tightening device 624. In this instance, the cover members 576, 578 are reassembled around the belt 506 and the pulleys 412, 504, and the shaft 640 to which the eccentric 638 is then turned to cause the arcuate flange 634 and the foot portion 632 to move inwardly toward the trailing end of the belt 506 and to reduce the curvature thereof. This last adjustment is made to hold the belt slippage to a very minimum which prevents shock while still maintaining the cutting knife or disc 514 at its desired speed. This last adjustment comprises, of course, a refinement over the first adjustment.

The slicing machine 20 is also unique in that means are provided for adjusting the sensing rollers 746, 802 in such a manner as to sense receptacles or containers which may vary in their respective vertical dimensions as per each given series thereof, but also to sense a series of containers or receptacles the diameters of which may differ from one series to the next, and to become operative to sense containers or receptacles wherein the spacing between each adjacent pair thereof may vary. The vertical adjustment is accomplished, of course, through the loosening of each pair of nuts 734, 736 to raise or lower the platform 728, after which the bolts are retightened to secure the platform in its now newly adjusted position. The horizontal adjustment to sense containers or receptacles which may vary in diameter from one series thereof to the next, is only necessary that the same pairs of nuts 734, 736 be loosened and the platform moved laterally with respect to the bolts 48, the bolts 48 being slidably received within each of the slots 730, respectively. After this adustment has been made, the pairs of nuts 734, 736 are retightened. To obtain the proper adjustment of the sensing rollers 746, 802 in order to sense, consecutively, adjacent pairs of containers or receptacles wherein the spacing between one series thereof and the subsequent series differs, it is only necessary that the bolts 741 be loosened to permit the microswitch valve 738 to be adjusted longitudinally of the platform 728, the bolts 741 sliding within slots 743, and retightening the bolts 741 after the proper adjustment has been made. A similar adjustment is made for the sensing roller 802, and in this case, the bolts 774 are loosened to permit the same to slide within the slots 732 as the micro-switch 772 is adjusted longitudinally of the platform 728. Or, an additional adjustment is provided through the same means whereby the rollers 746, 802 may be simultaneously moved toward and away from one another to obtain the desired spacing therebetween.

Reference numeral 2000 indicates a conventional knife sharpening device fixedly secured to the rear knife guard casing 518 by conventional means. The knife sharpening device 2000 forms no part of the instant invention.

Having described and illustrated one embodiment of this invention in detail, it will be understood that the same is offered merely by way of example, and that the scope of this invention is to be limited only by the appended claims.

What is claimed is:

1. A food slicing machine for slicing a plurality of block bulk foods disposed in end-to-end relationship and comprising an elongated substantially V-shaped stationary trough having the base side thereof opening upwardly, said trough including a back wall and a bottom wall, said back and bottom walls having adjacent pairs of front and rear ends, conveyor means supported on said trough and movable longitudinally of said back and bottom walls adjacent the apex of said trough, said conveyor means being movable in a direction parallel to said bottom wall and to said back wall, said conveyor means supporting said block bulk foods and being movable to convey said block bulk foods in a direction from said front ends of said back and bottom walls toward said rear ends thereof and to project a portion of said block bulk foods beyond said rear ends of said trough, block bulk food slicing means supported on said trough for oscillatory movement transversely of said rear ends of said trough and cooperating therewith to sever said portion of said block bulk foods from the main body of said block bulk foods, said bulk block food slicing means including a discoidal member and means for rotating said member, movable sensing means mounted on said trough in a position to engage and to be deflected by an outer side of a mass of bulk food mounted on said conveyor means and engaging said back wall, and means to modify the rate of movement of said conveyor means in accordance with the amount of deflection of said sensing means, said food slicing means comprising an elongated rocker arm including a pair of elongated laterally-spaced substantially hollow journals, a shaft mounted for rotation in each of said journals, respectively, means supporting the opposed ends of one of said shafts for rotation on said trough, said shafts being parallel to one another and having axes parallel to the apex of said trough, said shafts having a pair of adjacent ends, a pulley mounted on each of said shafts at said pair of adjacent ends thereof for rotation therewith, a pulley belt trained about said pulleys at said pair of adjacent ends of said shafts, said discoidal member being mounted on the other end of the other of said shafts, and motor means connected with said one shaft and supported on said trough, said motor means driving said discoidal member through said pulleys and belt, an arm having an end thereof connected to said journal housing of said one shaft, and means connected between said arm and said trough operable to effect oscillation of said rocker arm.

2. A food slicing machine as defined in claim 1, and adjustable pulley belt tensioning means mounted on said rocker arm.

3. A food slicing machine as defined in claim 2, wherein said means connected between said arm and said trough to effect oscillation of said rocker arm comprises a pneumatic cylinder having an end thereof pivotally connected and supported on said trough, and the other end thereof pivotally connected to said arm.

4. A food slicing machine as defined in claim 3, and reciprocable shutter means supported on said trough below the path of travel of said discoidal member, said shutter means being disposed adjacent said rear ends of said back and bottom walls and movable in a direction substantially perpendicular to the path of movement of said conveyor means to receive a portion of the first of the bulk block foods thereon after said slicing means has swung through a complete cycle and said conveying means has advanced a second block of bulk food to abut against and to push said last-named food portion over said rear ends of said back and bottom walls.

5. A food slicing machine as defined in claim 4, and means on said trough for removing said last-named portion of said food from said shutter as the latter moves in one direction.

6. A meat slicing machine for slicing meats in slab or bulk form, said machine comprising an elongated substantially rectangular frame, an inverted substantially V-shaped trough support opening upwardly and fixedly secured to said frame, said trough support comprising a pair of arms normally disposed relative to one another, one of said arms forming an obtuse angle relative to a horizontal plane passing through the apex end of said trough support, the other arm forming an acute angle relative to said horizontal plane passing through the apex of said trough, adjustable support means connected with said frame and said other of said arms to effect the leveling of said frame and consequently of said trough support, a substantially V-shaped trough mounted on said support and including a back wall and a bottom wall disposed normally with respect to one another, said bottom wall extending across said one arm and having portions thereof projecting on opposite sides of said one arm, one of said projecting portions of said bottom wall extending parallel to said other arm of said trough support in vertically-spaced relation relative thereto, said back wall extending upwardly relative to said bottom wall and having a shoulder intermediate the upper and lower ends thereof, said shoulder confronting the adjacent edge of the other projecting portion of said bottom wall in laterally-spaced relation relative thereto and defining an elongated slot therebetween, said bottom and back walls having an adjacent pair of front ends and an adjacent pair of rear ends, said rear ends having extensions projecting beyond said trough support and comprising the food discharge end of said machine, an endless meat conveyor having a side thereof movable in one direction from said front ends toward said rear ends of said back and bottom walls, means on said arms connected with said conveyor to intermittently drive said conveyor to move said movable side toward said discharge end of said machine, oscillating meat slicing means mounted on said frame for swinging movement transverse of the path of movement of said movable side, said meat slicing means cooperating with the extended rear ends of said back and bottom walls to slice a portion of bulk meat carried on said movable side projecting beyond said rear end extensions of said back and bottom walls, means supported on said frame and connected with said oscillating meat slicing means to effect oscillation thereof, and pressure-responsive means operatively-connected to said intermittent drive means and said oscillating meat slicing means to synchronize the same to actuate said conveyor drive means to advance said conveyor toward said front and rear ends of said back and bottom walls as said oscillating meat slicing means initiates its slicing cycle.

7. A meat slicing machine as defined in claim 6, wherein said means for intermittently driving said conveyor means comprises a pair of elongated shafts supported for rotation on said other arm of said trough support and extending transversely through said one arm thereof, a sprocket wheel fixedly secured on each of said shafts, respectively, for rotation therewith, said sprocket wheels being aligned, one with the other, an endless chain trained around said sprocket wheels in driving relationship therewith, said sprocket wheels and said chain being disposed on one side of said one arm and being longitudinally-spaced with respect thereto with one of said sprockets being disposed adjacent said rear end of said machine and the other of said sprockets being disposed adjacent the front end of said machine, said shaft for said sprocket disposed adjacent said rear end of said machine having a second sprocket mounted thereon and disposed on the opposite side of said one arm, a shaft rotatably supported on said one arm and projecting laterally therefrom, said last-named shaft having fixedly secured thereon an idler sprocket aligned with said sprocket disposed on the other side of said one arm, an endless chain trained around said idler sprocket and said sprocket disposed on said other side of said one arm, a ratchet wheel fixedly secured to one of said pair of elongated shafts, a ratchet pawl mounted on said one of said pair of elongated shafts for free rotation thereon in a position to drivingly-engage the teeth of said ratchet wheel, a pneumatic cylinder having an end thereof pivotally connected on said other arm of said trough support, and means including an arm having an end fixedly secured to said ratchet wheel pivotally connecting the other end of said pneumatic cylinder with said ratchet wheel.

8. A meat slicing machine as defined in claim 7, and means on said one of said pair of elongated shafts to control the active position of said ratchet pawl relative to the teeth on said ratchet wheel.

9. A meat slicing machine as defined in claim 7, wherein said oscillating meat slicing means comprises a rocket arm including a pair of laterally-spaced, elongated, substantially hollow cylindrical journals having their respective axes disposed parallel to one another and substantially parallel to the apex of said trough, a shaft rotatably supported in each of said journals, means connecting the opposed ends of one of said last-named shafts with said trough support means to permit said rocker arm to rotate freely about said last-named shaft, said shafts disposed within said journals having a pulley mounted on the adjacent ends thereof and an endless belt trained about said pulleys in driving relationship therewith, motor means connected with said last-named shaft and supported on said trough support means, a rotatable knife member mounted on the other of said shafts disposed within said journals, said knife member being oscillatory across said rear ends of said back and bottom walls in close proximity thereto, an arm fixedly secured to said one journal and projecting radially therefrom, a pneumatic cylinder having one of its ends pivotally connected with said last-named arm and the other end thereof pivotally connected to said trough support means, valve control means mounted on said trough support and connected with said pneumatic cylinders, said valve control means being operable to actuate said ratchet wheel to advance said first chain, and consequently said second chain, as said knife member initiates its cutting stroke, and pressure-responsive means for actuating said valve control means.

10. A meat slicing machine as defined in claim 9, wherein a substantially hollow meat guide member is fixedly secured to said trough support means adjacent said rear ends of said back and bottom walls to receive slices of meat from said bulk meat as said knife member is actuated, and a reciprocaable shutter mounted on said trough support means below the discharge end of said guide member, and means connected with said rocker arm for moving said shutter from below said guide member to permit said slices of meat to fall freely therethrough and therefrom.

11. A meat slicing machine as defined in claim 10, wherein said means for moving said shutter comprises an elongated shaft projecting from said one journal of said rocker arm, a shutter pawl carrier block fixedly secured to the free end of said last-named shaft, a bell-crank lever having one of its ends pivotally connected on said shutter pawl carrier block, said bell-crank lever having a nib at one of its other ends, a helicoidal spring having one of its ends fixedly connected to the third end of said bell-crank lever and its other end anchored to said shaft intermediate the ends thereof, said bell-crank lever being adapted for pivotal movement about a horizontal axis, a pawl release trigger block having an elongated substantially rectangular configuration, means pivotally connecting one end of said last-named block with said trough support means, means constantly biasing said last-named block for movement in one direction about its said pivotal connection, an arcuate flange fixedly secured to said last-named block and projecting laterally therefrom adjacent the other end thereof, said shutter having a tooth mounted thereon and projecting upwardly therefrom, said tooth having a notch facing one end of said shutter, said notch being engageable by said nib, said bell-crank lever having a pin projecting laterally therefrom adjacent said nib, said nib engaging within said notch as said knife member initiates its cutting stroke, causing said shutter to be moved in one direction with said pin passing below said arcuate flange, said pin, upon the return stroke of said knife member, riding upwardly on said arcuate flange causing said bell-crank lever to pivot in the opposite direction to effect disconnection between said nib and said notch to free said shutter for movement in the opposite direction, and resilient means connected with said shutter and said trough support to urge said shutter for movement in said opposite direction.

12. A meat slicing machine as defined in claim 11, wherein said pressure-responsive means comprise a plurality of spaced pneumatic micro-valve switches each switch including a switch actuating arm having a sensing roller fixedly secured to an end thereof, means supporting said micro-valve switches from said trough support means, said sensing rollers being disposed in the path of travel of a plurality of open-ended containers moving, intermittently, for positioning below said meat guide member, and said intermittent movement of said containers being such that one of said containers is disposed below the lower open end of said meat slicing guide member while said shutter is extended thereacross.

13. A meat slicing machine as defined in claim 12, and a plurality of meat-conveying substantially rectangular platforms connected to said last-named chain and movable therewith for conveying block meat from said front ends of said back and bottom walls toward said rear ends thereof, and means mounted on said back wall releasably engaging said block meat as the same approaches said rear ends of said back and bottom walls.

14. A meat slicing machine as defined in claim 13, and means engageable with and sensing an outer side of said block meat as the same moves to said rear ends of said back and bottom walls to control the effective throw of said ratchet pawl.

References Cited

UNITED STATES PATENTS 2,768,666   10/1956   Garapolo et al. ______ 146—95
3,105,533   10/1963   Hensgen et al. ____ 146—95 X
3,161,215   12/1964   Werder et al. ________ 146—94

W. GRAYDON ABERCROMBIE, *Primary Examiner.*

WILLIAM W. DYER, Jr., *Examiner.*